US011916733B2

(12) United States Patent
Shoesmith et al.

(10) Patent No.: US 11,916,733 B2
(45) Date of Patent: Feb. 27, 2024

(54) UPDATING NETWORK CONFIGURATION PARAMETERS

(71) Applicant: Sonos, Inc., Santa Barbara, CA (US)

(72) Inventors: William Shoesmith, Arlington, MA (US); Ted Lin, Ayer, MA (US); Jeffrey M. Peters, Cambridge, MA (US); Cameron Scott, Seattle, WA (US); James Babu, Seattle, WA (US); Andi Rusu, Seattle, WA (US); Bryan Cox, Edmonds, WA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 17/688,431

(22) Filed: Mar. 7, 2022

(65) Prior Publication Data
US 2022/0286356 A1 Sep. 8, 2022

Related U.S. Application Data

(60) Provisional application No. 63/158,155, filed on Mar. 8, 2021.

(51) Int. Cl.
*H04L 41/0813* (2022.01)
*H04W 12/50* (2021.01)
(Continued)

(52) U.S. Cl.
CPC ...... *H04L 41/0813* (2013.01); *H04L 41/0879* (2013.01); *H04W 12/102* (2021.01); *H04W 12/50* (2021.01); *H04W 84/10* (2013.01)

(58) Field of Classification Search
None
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
WO 200153994 7/2001
WO 2003093950 A2 11/2003

OTHER PUBLICATIONS

Audio Tron Quick Start Guide, Version 1.0, Mar. 2001, 24 pages.
(Continued)

*Primary Examiner* — Mohamed A. Wasel
*Assistant Examiner* — Gregory P Tolchinsky

(57) ABSTRACT

An example computing device is configured to (i) establish a connection to a secure wireless network (ii) determine that one or more playback devices of a media playback system are not connected to the secure wireless network (iii) receive, via a graphical display, a user input indicating a request to update the one or more playback devices with network configuration parameters for the secure wireless network, (iv) retrieve, from storage, a list of the one or more playback devices, (v) receive an input indicating a first playback device to be updated from the list, (vi) establish an initial communication path with the first playback device, (vii) transmit a set of one or more messages to the first computing device collectively comprising the network configuration parameters for the secure wireless network, and (viii) receive an indication that the first computing device has established a connection to the secure wireless network.

17 Claims, 15 Drawing Sheets

(51) Int. Cl.
*H04W 12/102* (2021.01)
*H04L 41/08* (2022.01)
*H04W 84/10* (2009.01)

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | Mccarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 10,999,331 | B1 * | 5/2021 | Marchand ............ H04L 65/403 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2014/0064138 | A1 * | 3/2014 | Urdang .................. H04L 41/14 370/254 |
| 2014/0229959 | A1 | 8/2014 | Beckhardt et al. |
| 2014/0366105 | A1 | 12/2014 | Bradley et al. |
| 2015/0382198 | A1 | 12/2015 | Kashef et al. |
| 2020/0267552 | A1 | 8/2020 | Lee et al. |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion dated May 25, 2022, issued in connection with International Application No. PCT/US2022/019158, filed on Mar. 7, 2022, 13 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc. v. D&M Holdings* (No. 14-1330-RGA), DI 219, Claim Construction Opinion (Jan. 12, 2017) (24 pages).
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

UPDATING NETWORK CONFIGURATION PARAMETERS

CROSS-REFERENCE TO RELATED APPLICATIONS

This application claims the benefit of priority under 35 U.S.C. § 119 to U.S. Provisional Patent App. No. 63/158,155, filed on Mar. 8, 2021, which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
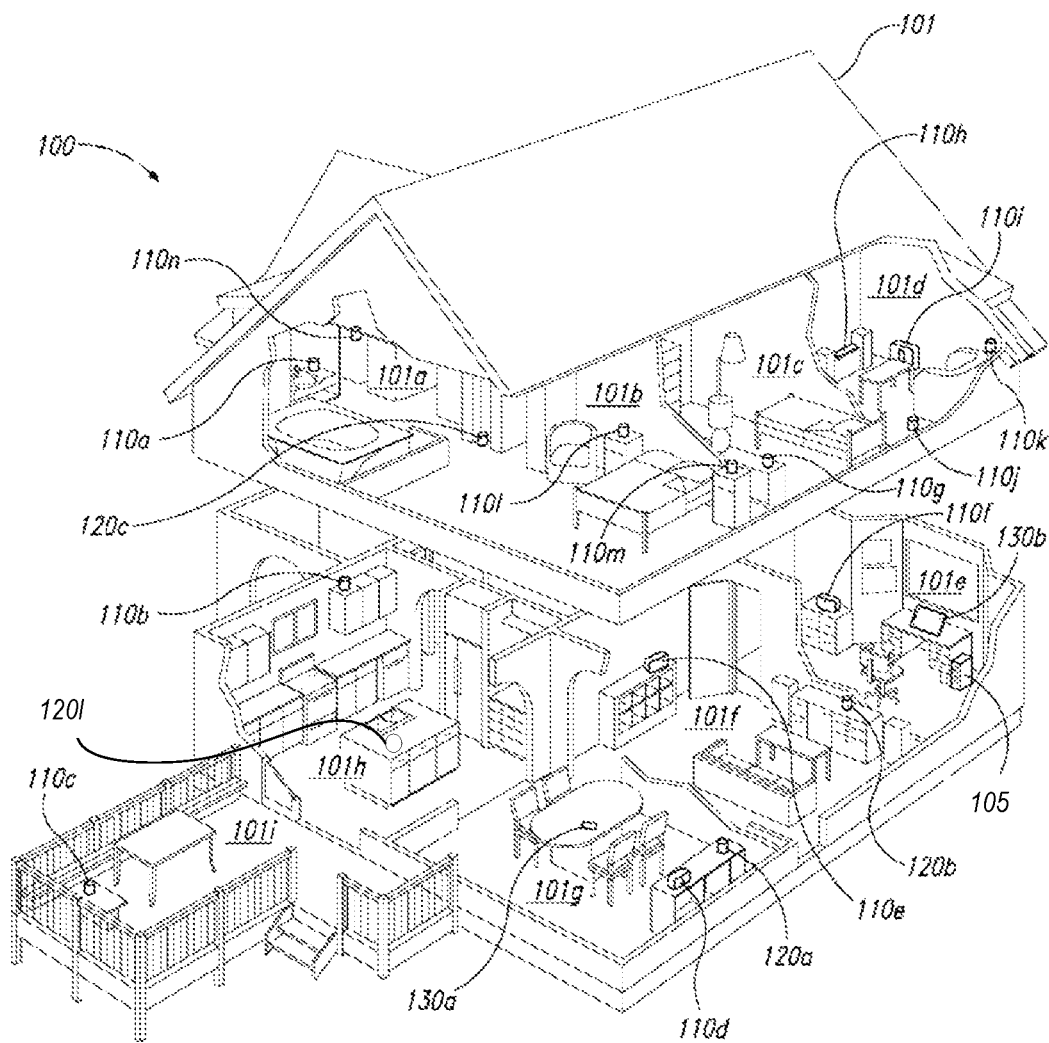
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to techniques for reconfiguring network configuration parameters for the playback devices in a media playback system when the previous network configuration parameters used by the playback devices are no longer valid. In particular, the embodiments herein discuss a control device establishing a direction connection with a first playback and providing the first playback device with updated network configuration parameters for connection to a new or updated secure wireless network. The first playback device may then pass the updated network configuration parameters to one or more other playback devices of the media playback system via one or more direct connections among the playback devices, such that each playback that receives the updated network configuration parameters can connect to the new or updated secure wireless network.

For example, many existing networked media playback systems operate over a secure wireless network, such as a secure wireless local area network ("WLAN"), that each playback device of the media playback system connects to using a set of wireless network configuration parameters. In this regard, wireless network configuration parameters generally include a network identifier, which is frequently expressed as a service set identifier (SSID) that may be generated and broadcast by an access point (e.g., a router). In many cases, network configuration parameters also include a security key or password that, when paired with the network identifier, enables a playback device to connect to the WLAN (e.g., a user's home WiFi network) and thereby join the networked media playback system a communicate with other member playback devices.

However, in some situations, one or more of the network configuration parameters may change such that the playback devices of the media playback system can no longer connect to the WLAN. For example, a user may replace their WiFi router and may change one or both of the SSID and password for the new WLAN that is set up. As another possibility, the user may opt to change the password on their existing WiFi router. In either case, the playback devices of the user's media playback system may be unable to connect to the new secure wireless network without receiving the updated network configuration parameters.

In this regard, the examples discussed herein may refer to updating network configuration parameters to enable playback devices to connect to a "new" secure wireless network, or a "second" secure wireless network after formerly being connected to a "first" secure wireless network. However, it will be appreciated that in some cases (e.g., where the access point and SSID remain the same, but the password is changed), the playback devices might be considered to be reconnecting to the same network, not a new or second network, after the network configuration parameters are updated. Accordingly, references herein to a new or second network should be understood to encompass an existing network with an updated set of network configuration parameters.

In situations where a user updates the network configuration parameters of their WiFi network, the user may initially update a computing device, such as a smartphone, with the updated network configuration parameters and the computing device may then connect to the new WLAN. The computing device may then determine, via media playback system controller application software installed on the computing device, that no playback devices are detected on the network. The user may then provide an input indicating that their network configuration parameters have changed, and that they wish to update their media playback system to connect the media playback system to the new network. In some cases, the computing device might prompt the user (e.g., upon opening the controller application) with a notification that no playback devices are detected on the secure wireless network and asking the user whether they had updated their network configuration parameters.

The user may respond affirmatively and indicate that they wish to update the playback devices of their media playback system with the new network credentials. In response, the computing device may obtain a list of playback devices in the media playback system to be updated. This may require the user to first login to their media playback system account (e.g., their SONOS account) to obtain the list. The list may be stored, for example, in a local cache of the controller application, on a cloud-based computing system, or a combination of both. In some situations where the user's account is associated with multiple different media playback systems, the user may be prompted to select which system they are updating, in order to obtain the correct list of playback devices.

After obtaining the list of playback devices, the computing device may prompt the user to select a first playback device to update with the new network credentials, which may involve establishing a direct connection between the computing device and the first playback device. In this regard, the computing device may suggest a first playback device from the obtained list based on various factors, such as the ease of interaction for the user and/or the reliability of the direct connection that will be established. The suggested first playback device may be emphasized to the user via any of a variety of mechanisms (e.g., by ordering that playback device first, emphasizing the text and/or button(s) associated with that playback devices, etc.). In some embodiments, the computing device may detect a BLE beacon or similar message from a nearby playback device, and suggest the nearby playback device as the first playback device based on this detection. Other examples are also possible.

Once the first playback device is selected, the computing device may prompt the user to select the new wireless network for connection, which may prompt the user to enter the password for the new wireless network. Once the computing device has received the updated credentials from the user, the computing device may transmit the updated network credentials to the first playback device via a direct connection, such as a BLE connection and/or an ad-hoc WiFi connection. The first playback device, upon successfully establishing a network connection using the updated network credentials, may notify (e.g., via one or more messages) the computing device of the successful connection. The computing device and/or the first playback device may then (e.g., automatically or based on user input) attempt to propagate the updated network credentials. For instance, the other playback devices in the household that have lost their network connection may have automatically started transmitting probe messages for help (e.g., from another playback device and/or the computing device) to obtain new network credentials. Thus, the computing device may transmit a command for the first playback device to enter a mode in which the first playback device (i) parks on a default WiFi channel and (ii) responds to any probe messages it receives with an instruction for the other playback device to also park on the default WiFi channel. In this way, the first playback device may establish a point-to-point communication link with the other playback devices of the media playback system on the default WiFi channel. Numerous other examples and variations are also possible, many of which will be discussed in further detail below. Still yet further examples are described in U.S. Pat. No. 10,292,089 issued on May 14, 2019 and titled "Re-Establishing Connectivity on Lost Players," which is hereby incorporated herein by reference in its entirety and attached hereto as Appendix A.

After the first playback device has propagated the updated credentials to the other playback devices of the media playback system, the other playback devices may connect to the new WLAN. Accordingly, the computing device may display an indication that the other playback devices are now visible on the new WLAN and controllable by the computing device. In some cases, the computing device may determine that one or more playback devices from the list is not connected to the new WLAN, either because it is not capable of making a point-to-point connection with the first playback device, or because the point-to-point communications were unsuccessful for some reason. For these playback devices, the user may be prompted to take some additional action, such as moving closer to the playback device or interacting with the playback device (e.g., pressing a button) to facilitate the computing device providing the updated network credentials directly to the playback device.

As noted above, embodiments described herein relate to techniques for reconfiguring network configuration parameters for the playback devices in a media playback system when the previous network configuration parameters used by the playback devices are no longer valid. In one aspect, for example, the disclosed techniques may take the form of a method carried out by a computing device that involves (i) establishing a connection to a secure wireless network, (ii) determining that one or more playback devices of a media playback system are not connected to the secure wireless network, (iii) receiving, via a graphical display, a user input indicating a request to update the one or more playback devices with network configuration parameters for the secure wireless network, (iv) retrieving, from storage, a list of the one or more playback devices associated with the media playback system, (v) receiving, via the graphical display, an input indicating a first playback device to be updated from the list, (vi) establishing an initial communication path with the first playback device, (vii) transmitting a set of one or more messages to the first computing device collectively comprising the network configuration parameters for the secure wireless network, and (viii) receiving an indication that the first computing device has established a connection to the secure wireless network.

In another aspect, the disclosed technology may take the form of a computing device comprising a graphical display, at least one processor, a non-transitory computer-readable medium, and program instructions stored on the non-transitory computer-readable medium that are executable by the at least one processor such that the computing system is configured to carry out the functions of the aforementioned method.

In another aspect, the disclosed technology may take the form of a non-transitory computer-readable medium comprising program instructions stored thereon that are executable to cause a computing device to carry out the functions of the aforementioned method.

In yet another aspect, for example, the disclosed techniques may take the form of a method carried out by a playback device that involves (i) determining that a connection to a first secure wireless network connection has been lost, (ii) transmitting at least one message that indicates that the first playback device is available for setup, where the message comprises an indication of network connection capability of the first playback device, (iii) establishing a first direct communication path with a computing device configured to operate on a second secure wireless network, (iv) receiving, from the computing device over the first direct communication path, network configuration parameters for connecting to the second secure wireless network, (v) establishing a connection to the second secure wireless network, (vi) receiving, from a second playback device of the media playback system, a message indicating that the second playback device has lost a secure wireless network connection, (vii) establishing a second direct communication path with the second playback device, and (viii) transmitting, via the second direct communication path to the second playback device, the network configuration parameters for connecting to the second secure wireless network.

In yet another aspect, the disclosed technology may take the form of a playback device comprising at least one processor, a non-transitory computer-readable medium, and program instructions stored on the non-transitory computer-readable medium that are executable by the at least one processor such that the playback system is configured to carry out the functions of the aforementioned method.

In yet another aspect, the disclosed technology may take the form of a non-transitory computer-readable medium comprising program instructions stored thereon that are executable to cause a playback device to carry out the functions of the aforementioned method.

Although the example network environments, connected devices, and reconfiguration of network credentials discussed herein are generally focused on media playback devices and their associated features, it should be understood that the techniques presented here may also be implemented to address similar problems in other systems of networked devices, Internet-of-Things devices, smart home devices, etc. Indeed, many of the same benefits associated with easily replicating updated network credentials across a system of devices are equally applicable in numerous other types of systems.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

II. Suitable Operating Environment a. Suitable Media Playback System

Figure 1B:
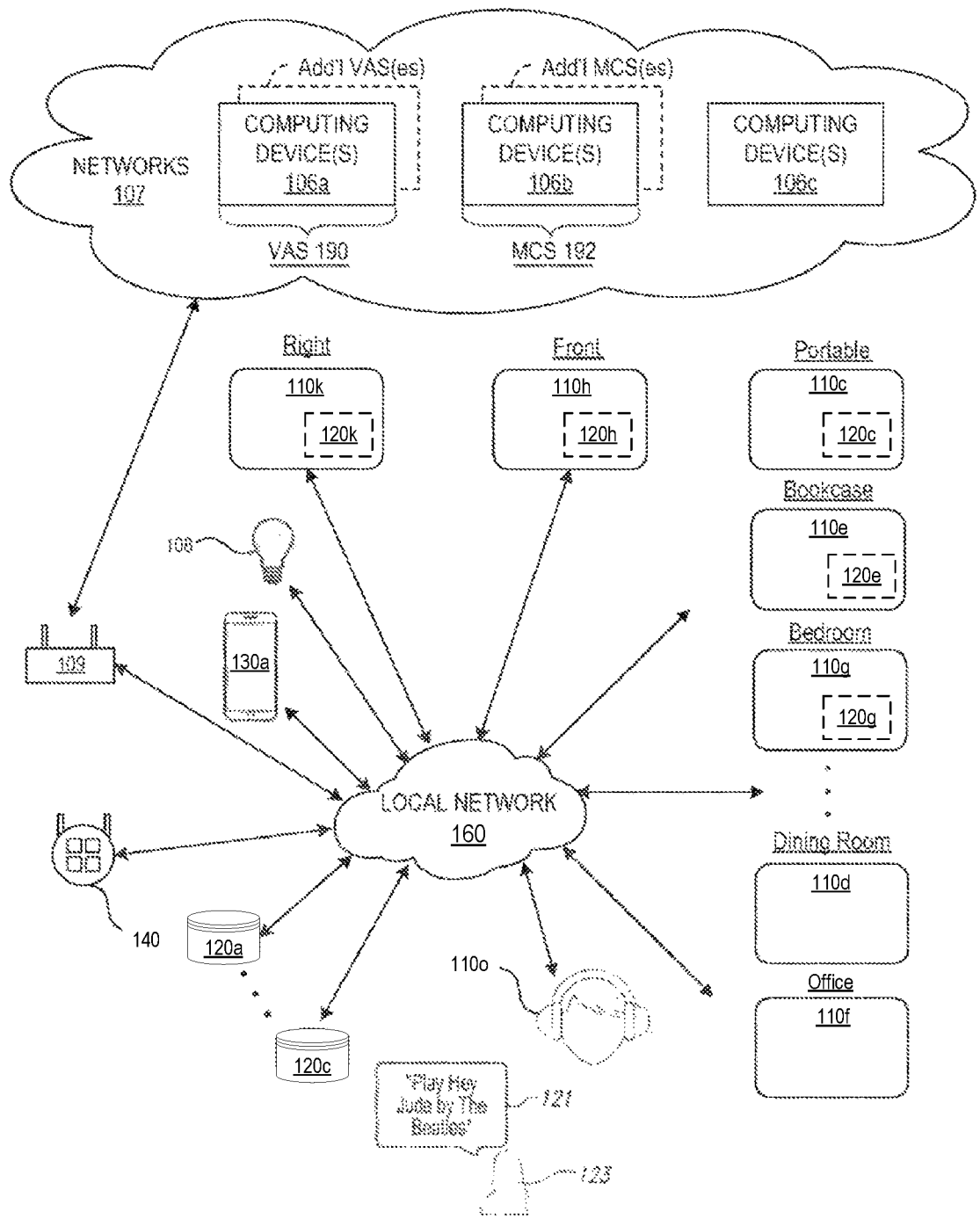
FIG. 1B is a schematic diagram of the media playback system of FIG. 1A and one or more networks.

FIGS. 1A and 1B illustrate an example configuration of a media playback system ("MPS") 100 in which one or more embodiments disclosed herein may be implemented. Referring first to FIG. 1A, a partial cutaway view of MPS 100 distributed in an environment 101 (e.g., a house) is shown. The MPS 100 as shown is associated with an example home environment having a plurality of rooms and spaces. The MPS 100 comprises one or more playback devices 110 (identified individually as playback devices 110*a-o*), one or more network microphone devices ("NMDs") 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the MPS 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the MPS 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the MPS 100 is configured to play back audio from a first playback device (e.g., the playback device 100a) in synchrony with a second playback device (e.g., the playback device 100b). Interactions between the playback devices 110, NMDs 120, and/or control devices 130 of the MPS 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The MPS 100 can comprise one or more playback zones, some of which may correspond to the rooms in the environment 101. The MPS 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices.

Referring to FIG. 1B, the home environment may include additional and/or other computing devices, including local network devices, such as one or more smart illumination devices 108 (FIG. 1B), a smart thermostat 140, and a local computing device 105 (FIG. 1A). In embodiments described below, one or more of the various playback devices 110 may be configured as portable playback devices, while others may be configured as stationary playback devices. For example, the headphones 110o (FIG. 1B) are a portable playback device, while the playback device 110e on the bookcase may be a stationary device. As another example, the playback device 110c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices and/or other network devices of the MPS 100 may be coupled to one another via point-to-point connections and/or over other connections, which may be wired and/or wireless, via a local network 160 that may include a network router 109. For example, the playback device 110j in the Den 101d (FIG. 1A), which may be designated as the "Left" device, may have a point-to-point connection with the playback device 110k, which is also in the Den 101d and may be designated as the "Right" device. In a related embodiment, the Left playback device 110j may communicate with other network devices, such as the playback device 110h, which may be designated as the "Front" device, via a point-to-point connection and/or other connections via the local network 160.

The local network 160 may be, for example, a network that interconnects one or more devices within a limited area (e.g., a residence, an office building, a car, an individual's workspace, etc.). The local network 160 may include, for example, one or more local area networks (LANs) such as a wireless local area network (WLAN) (e.g., a WIFI network, a Z-Wave network, etc.) and/or one or more personal area networks (PANs) (e.g. a BLUETOOTH network, a wireless USB network, a ZigBee network, an IRDA network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 102.11b, 802.11g, 802.12, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, 6 GHz, and/or another suitable frequency.

The MPS 100 is configured to receive media content from the local network 160. The received media content can comprise, for example, a Uniform Resource Identifier (URI) and/or a Uniform Resource Locator (URL). For instance, in some examples, the MPS 100 can stream, download, or otherwise obtain data from a URI or a URL corresponding to the received media content.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the environment 101 (FIG. 1A).

In some implementations, the various playback devices 110, NMDs 120, and/or control devices 130 may be communicatively coupled to at least one remote computing device associated with a voice assistant service ("VAS") and/or at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some embodiments, the various playback devices 110, NMDs 120, and/or control devices 130 may transmit data associated with a received voice input to a VAS configured to (i) process the received voice input data and (ii) transmit a corresponding command to the MPS 100. In some aspects, for example, the computing devices 106a may comprise one or more modules and/or servers of a VAS. In some implementations, VASes may be operated by one or more of SONOS®, AMAZON®, GOOGLE® APPLE®, MICROSOFT®, NUANCE®, or other voice assistant providers. In some implementations, MCSes may be operated by one or more of SPOTIFY, PANDORA, AMAZON MUSIC, GOOGLE PLAY, or other media content services.

In some embodiments, the local network 160 comprises a dedicated communication network that the MPS 100 uses to transmit messages between individual devices and/or to transmit media content to and from MCSes. In certain embodiments, the local network 160 is configured to be accessible only to devices in the MPS 100, thereby reducing interference and competition with other household devices. In other embodiments, however, the local network 160 comprises an existing household communication network (e.g., a household WIFI network). In some embodiments, the MPS 100 is implemented without the local network 160, and the various devices comprising the MPS 100 can communicate with each other, for example, via one or more direct connections, PANs, telecommunication networks (e.g., an LTE network or a 5G network, etc.), and/or other suitable communication links.

In some embodiments, audio content sources may be regularly added or removed from the MPS 100. In some embodiments, for example, the MPS 100 performs an indexing of media items when one or more media content sources are updated, added to, and/or removed from the MPS 100. The MPS 100 can scan identifiable media items in some or all folders and/or directories accessible to the various playback devices and generate or update a media content database comprising metadata (e.g., title, artist, album, track length) and other associated information (e.g., URIs, URLs) for each identifiable media item found. In some embodiments, for example, the media content database is stored on one or more of the various playback devices, network microphone devices, and/or control devices of MPS 100.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 110 may take the form of or include an on-board (e.g., integrated) network microphone device configured to receive voice utterances from a user. For example, the playback devices 110c-110h, and 110k include or are otherwise equipped with corresponding NMDs 120c-120h, and 120k, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMD 120l may be a stand-alone device. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110e because it is physically situated on a bookcase. Similarly, the NMD 120l may be assigned the named "Island" because it is physically situated on an island countertop in the Kitchen 101h (FIG. 1A). Some playback devices may be assigned names according to a zone or room, such as the playback devices 110g, 110d, and 110f, which are named "Bedroom," "Dining Room," and "Office," respectively. Further, certain playback devices may have functionally descriptive names. For example, the playback devices 110k and 110h are assigned the names "Right" and "Front," respectively, because these two devices are configured to provide specific audio channels during media playback in the zone of the Den 101d (FIG. 1A). The playback device 110c in the Patio may be named "Portable" because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 120 are configured to interact with the VAS 190 over the local network 160 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 105, 110, 120, and 130 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. Patent Publication No. 2017-0242653 published Aug. 24, 2017, and titled "Voice Control of a Media Playback System," which is herein incorporated by reference in its entirety.

Upon receiving the stream of sound data, the VAS 190 may determine if there is voice input in the streamed data from the NMD, and if so the VAS 190 may also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the NIPS 100 or indirectly via the VAS 190. In some implementations, the VAS 190 may transmit to the NIPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 110e in the environment 101 (FIG. 1A) is in relatively close proximity to the NMD-equipped Living Room playback device 120b, and both devices 110e and 120b may at least sometimes detect the same sound. In such cases, this may require arbitration as to which device is ultimately responsible for providing detected-sound data to the remote VAS. Examples of arbitrating between NMDs may be found, for example, in previously referenced U.S. Patent Publication No. 2017-0242653.

In certain implementations, an NMD may be assigned to, or otherwise associated with, a designated or default playback device that may not include an NMD. For example, the Island NMD 120l in the Kitchen 101h (FIG. 1A) may be assigned to the Dining Room playback device 110d, which is in relatively close proximity to the Island NMD 120l. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Publication No. 2017-0242653.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback devices 110, network microphone devices 120, and/or control devices 130. For example, the technologies herein may be utilized within an environment having a single playback device 110 and/or a single NMD 120. In some examples of such cases, the local network 160 (FIG. 1B) may be eliminated and the single playback device 110 and/or the single NMD 120 may communicate directly with the remote computing devices 106a-c. In some embodiments, a telecommunication network (e.g., an LTE network, a 5G network, etc.) may communicate with the various playback devices 110, network microphone devices 120, and/or control devices 130 independent of the local network 160.

b. Suitable Playback Devices

Figure 1C:
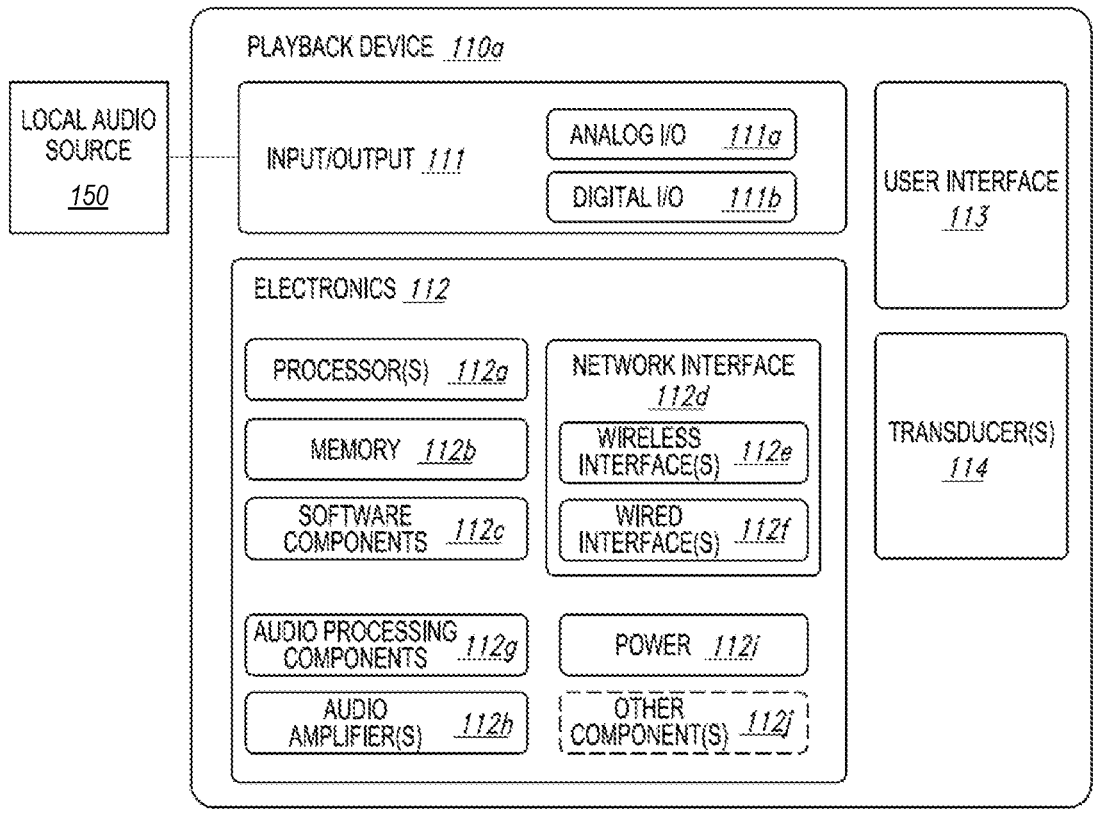
FIG. 1C is a block diagram of an example playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WIFI, BLUETOOTH, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 150 via the input/output 111 (e.g., a cable, a wire, a PAN, a BLUETOOTH connection, an ad hoc wired or wireless communication network, and/or another suitable communication link). The local audio source 150 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 150 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 150. In other embodiments, however, the media playback system omits the local audio source 150 altogether. In some embodiments, the playback device 110a does not include an input/output 111 and receives all audio content via the local network 160.

The playback device 110a further comprises electronics 112, a user interface 113 (e.g., one or more buttons, knobs, dials, touch-sensitive surfaces, displays, touchscreens), and one or more transducers 114 (e.g., a driver), referred to hereinafter as "the transducers 114." The electronics 112 is configured to receive audio from an audio source (e.g., the local audio source 150) via the input/output 111, one or more of the computing devices 106a-c via the local network 160 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power components 112i (e.g., one or more power supplies, power cables, power receptacles, batteries, induction coils, Power-over Ethernet (POE) interfaces, and/or other suitable sources of electric power).

In some embodiments, the electronics 112 optionally include one or more other components 112j (e.g., one or more sensors, video displays, touchscreens, battery charging bases). In some embodiments, the playback device 110a and electronics 112 may further include one or more voice processing components that are operable coupled to one or more microphones, and other components as described below with reference to FIGS. 1F and 1G.

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the MPS 100. In some aspects, for example, the state data is shared during predetermined intervals of time (e.g., every 5 seconds, every 10 seconds, every 60 seconds) among at least a portion of the devices of the MPS 100, so that one or more of the devices have the most recent data associated with the MPS 100.

The network interface 112d is configured to facilitate a transmission of data between the playback device 110a and one or more other devices on a data network. The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the local network 160 (FIG. 1B) in accordance with a suitable wireless communication protocol (e.g., WIFI, BLUETOOTH, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

In some implementations, the power components 112*i* of the playback device 110*a* may additionally include an internal power source (e.g., one or more batteries) configured to power the playback device 110*a* without a physical connection to an external power source. When equipped with the internal power source, the playback device 110*a* may operate independent of an external power source. In some such implementations, an external power source interface may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The user interface 113 may facilitate user interactions independent of or in conjunction with user interactions facilitated by one or more of the control devices 130 (FIG. 1A). In various embodiments, the user interface 113 includes one or more physical buttons and/or supports graphical interfaces provided on touch sensitive screen(s) and/or surface(s), among other possibilities, for a user to directly provide input. The user interface 113 may further include one or more lights (e.g., LEDs) and the speakers to provide visual and/or audio feedback to a user.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

In some embodiments, the playback device 110*a* may include a speaker interface for connecting the playback device to external speakers. In other embodiments, the playback device 110*a* may include an audio interface for connecting the playback device to an external audio amplifier or audio-visual receiver.

Figure 1D:
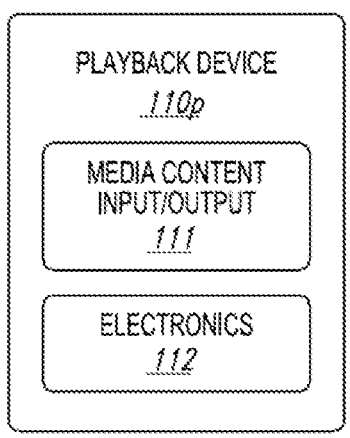
FIG. 1D is a block diagram of an example playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
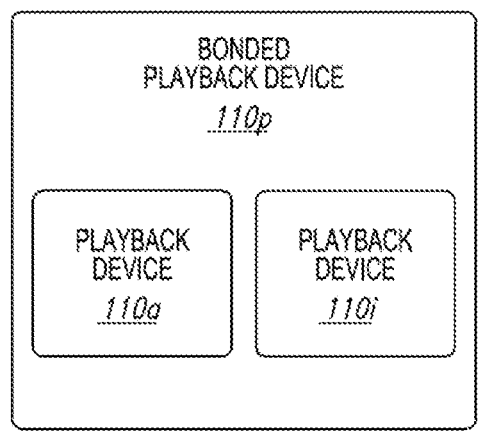
FIG. 1E is a block diagram of an example playback device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with playback device 110*i*, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

Figure 4:
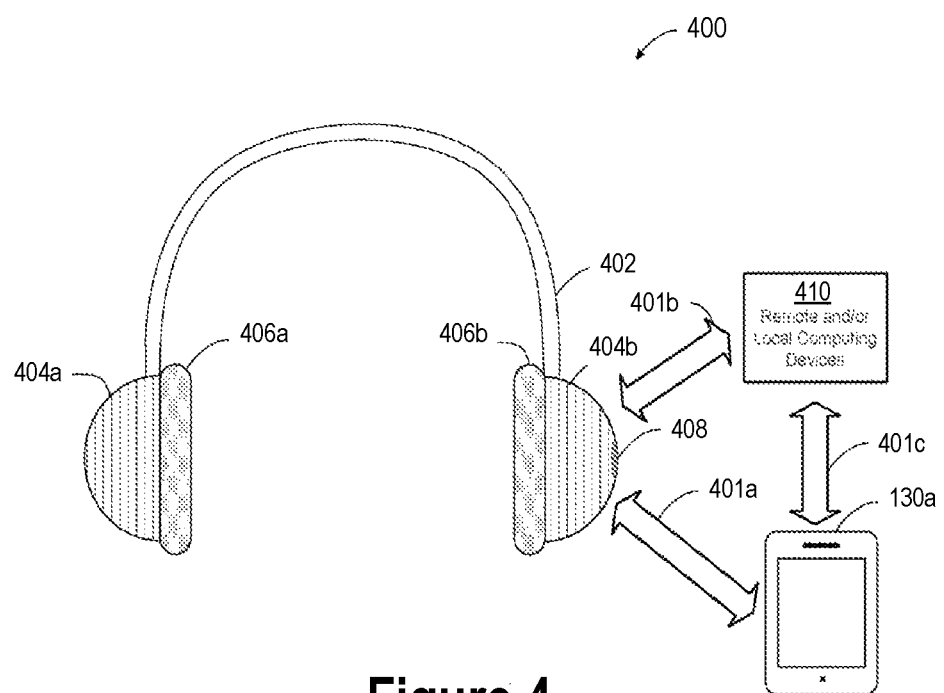
FIG. 4 is a diagram of an example headset assembly for the playback device of FIG. 3.

In some embodiments, one or more of the playback devices 110 may take the form of a wired and/or wireless headphone (e.g., an over-ear headset, an on-ear headset, or an in-ear headset). For instance, FIG. 4 shows an example headset assembly 400 ("headset 400") for such an implementation of one of the playback devices 110. As shown, the headset 400 includes a headband 402 that couples a first earcup 404a to a second earcup 404b. Each of the earcups 404a and 0244b may house any portion of the electronic components in the playback device 110, such as one or more speakers. Further, one or more of the earcups 404a and 404b may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406a and 406b that are coupled to ear cups 404a and 404b, respectively. The ear cushions 406a and 406b may provide a soft barrier between the head of a user and the earcups 404a and 404b, respectively, to improve user comfort and/or provide acoustic isolation from the ambient (e.g., passive noise reduction (PNR)).

As described in greater detail below, the electronic components of a playback device may include one or more network interface components (not shown in FIG. 4) to facilitate wireless communication over one more communication links. For instance, a playback device may communicate over a first communication link 401a (e.g., a BLUETOOTH link) with one of the control devices 130 and/or over a second communication link 401b (e.g., a WIFI or cellular link) with one or more other computing devices 410 (e.g., a network router and/or a remote server). As another possibility, a playback device may communicate over multiple communication links, such as the first communication link 401a with the control device 130a and a third communication link 401c (e.g., a WIFI or cellular link) between the control device 130a and the one or more other computing devices 410. Thus, the control device 130a may function as an intermediary between the playback device and the one or more other computing devices 410, in some embodiments.

In some instances, the headphone device may take the form of a hearable device. Hearable devices may include those headphone devices (including ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.)

It should be appreciated that one or more of the playback devices 110 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback devices 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

c. Suitable Network Microphone Devices (NMD)s

Figures 1F, 1G:
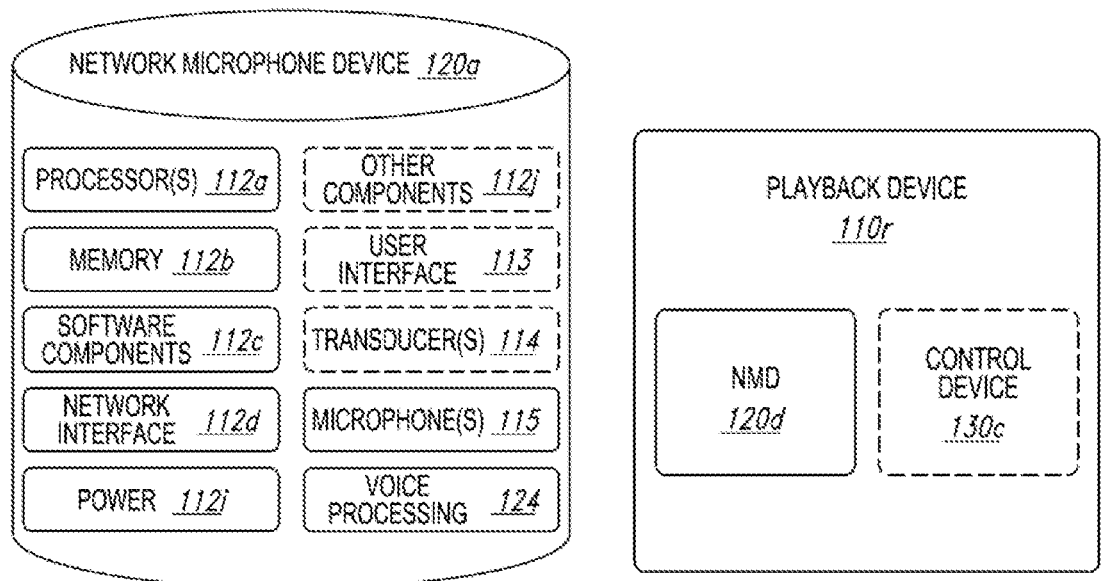
FIG. 1F is a block diagram of an example network microphone device.
FIG. 1G is a block diagram of an example playback device.

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115.

The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing components 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing components 124 (FIG. 1F). The microphones 115 are configured to detect sound (i.e., acoustic waves) in the environment of the playback device 110r, which is then provided to voice processing components 124. More specifically, each microphone 115 is configured to detect sound and convert the sound into a digital or analog signal representative of the detected sound, which can then cause the voice processing component to perform various functions based on the detected sound, as described in greater detail below. In some implementations, the microphones 115 may be arranged as an array of microphones (e.g., an array of six microphones). In some implementations the playback device 110r may include fewer than six microphones or more than six microphones. The playback device 110r optionally includes an integrated control device 130c. The control device 130c can comprise, for example, a user interface configured to receive user input (e.g., touch input, voice input) without a separate control device. In other embodiments, however, the playback device 110r receives commands from another control device (e.g., the control device 130a of FIG. 1B).

In operation, the voice-processing components 124 are generally configured to detect and process sound received via the microphones 115, identify potential voice input in the detected sound, and extract detected-sound data to enable a VAS, such as the VAS 190 (FIG. 1B), to process voice input identified in the detected-sound data. The voice processing components 124 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 124 may include or otherwise take the form of one or more DSPs or one or more modules of a DSP. In this respect, certain voice processing components 124 may be configured with particular parameters (e.g., gain and/or spectral parameters) that may be modified or otherwise tuned to achieve particular functions. In some implementations, one or more of the voice processing components 124 may be a subcomponent of the processor 112a.

In some implementations, the voice-processing components 124 may detect and store a user's voice profile, which may be associated with a user account of the MPS 100. For example, voice profiles may be stored as and/or compared to variables stored in a set of command information or data table. The voice profile may include aspects of the tone of frequency of a user's voice and/or other unique aspects of the user's voice, such as those described in previously-referenced U.S. Patent Publication No. 2017-0242653.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing components 124 receive and analyze the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Controller Devices

Figure 1H:
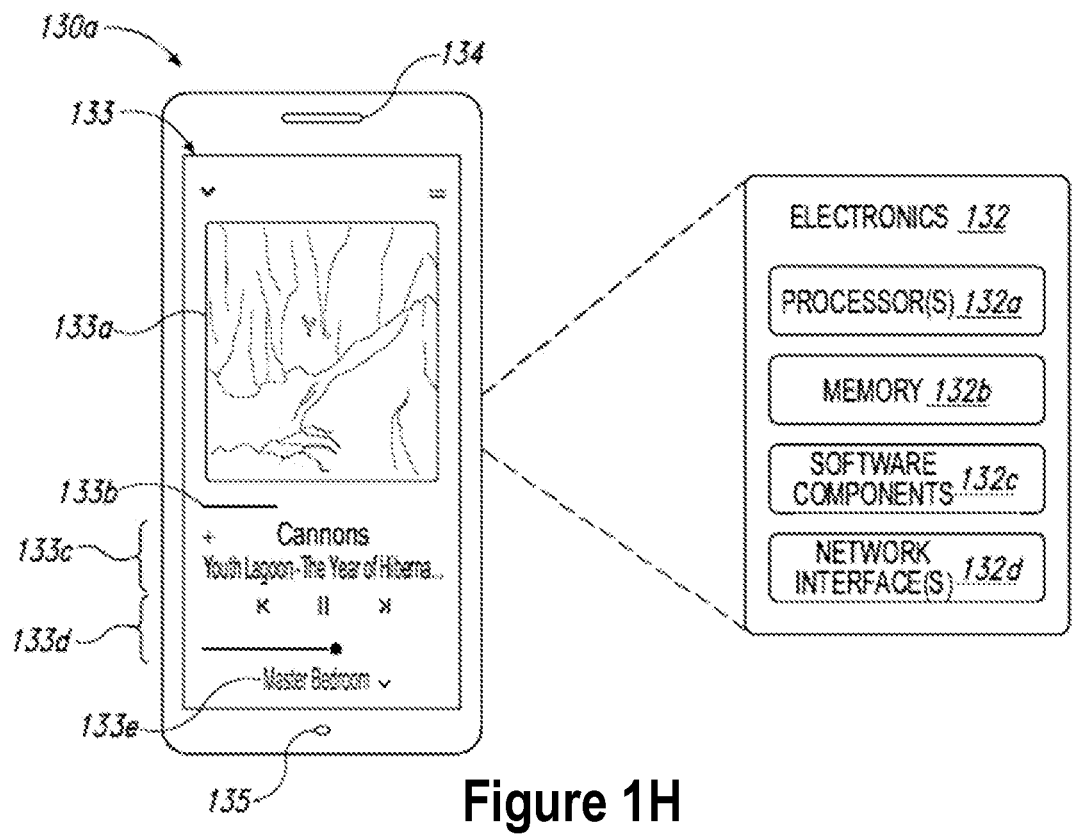
FIG. 1H is a partially schematic diagram of an example control device.

FIG. 1H is a partially schematic diagram of one of the control device 130a (FIGS. 1A and 1B). As used herein, the term "control device" can be used interchangeably with "controller," "control device," or "control system." Among other features, the control device 130a is configured to receive user input related to the MPS 100 and, in response, cause one or more devices in the MPS 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the MPS 100. In other embodiments, as described above with respect to FIG. 1G, the control device 130a is integrated into another device in the MPS 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the MPS 100. The memory 132b can comprise data storage that can be loaded with one or more of the software components executable by the processor 302 to perform those functions. The software components 132c can comprise applications and/or other executable software configured to facilitate control of the MPS 100. The memory 112b can be configured to store, for example, the software components 132c, media playback system controller application software, and/or other data associated with the MPS 100 and the user.

The network interface 132d is configured to facilitate network communications between the control device 130a and one or more other devices in the MPS 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.12, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130a to one or more of the playback devices 110. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others. Additional description of zones and groups can be found below with respect to FIGS. 1J through 2.

Figure 1I:
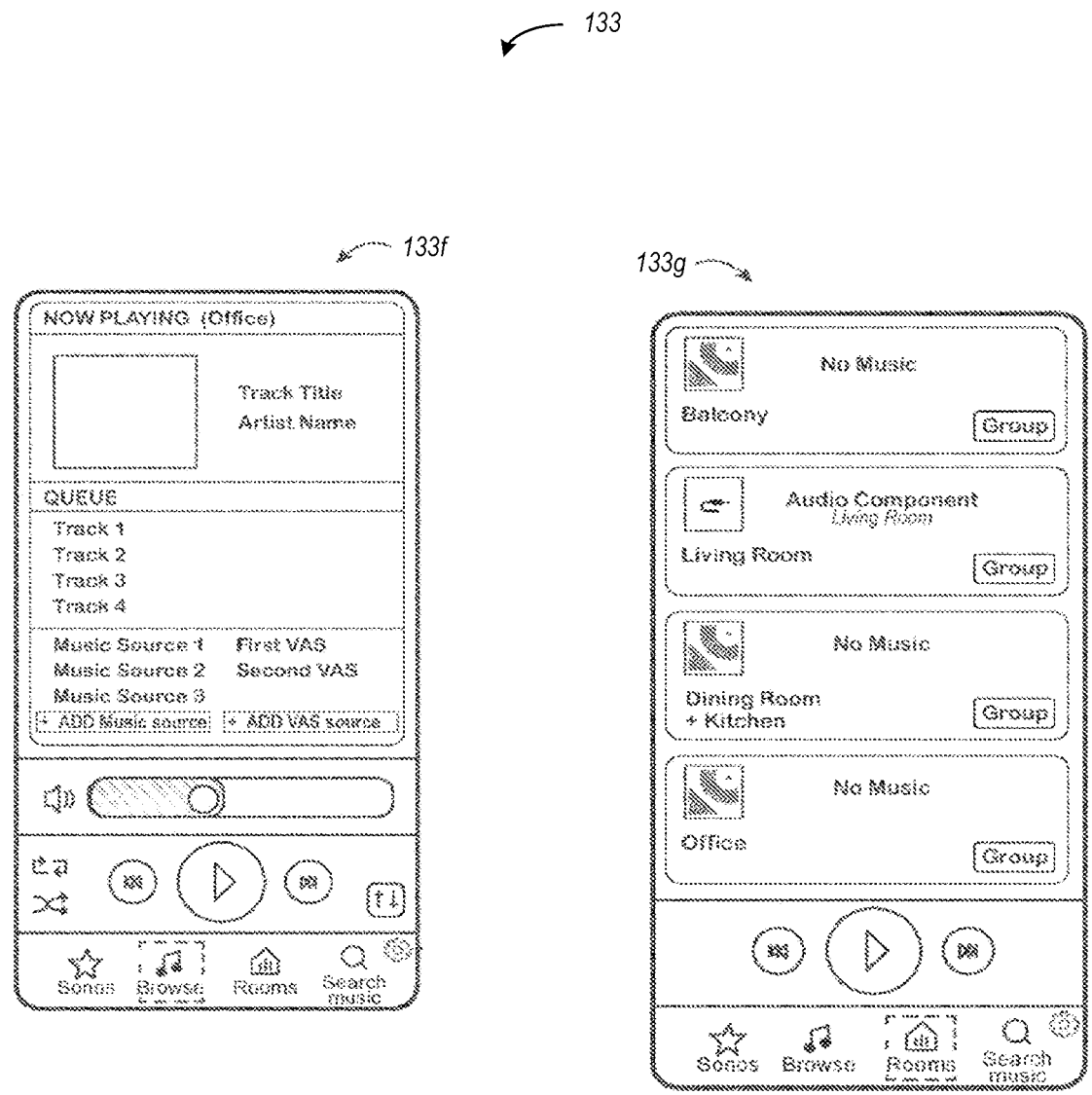
FIG. 1I is a schematic diagram of example user interfaces of the example control device of FIG. 1H.

The user interface 133 is configured to receive user input and can facilitate control of the MPS 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system. FIG. 1I shows two additional user interface displays 133f and 133g of user interface 133. Additional examples are also possible.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

e. Suitable Playback Device Configurations

Figures 1J, 1K:
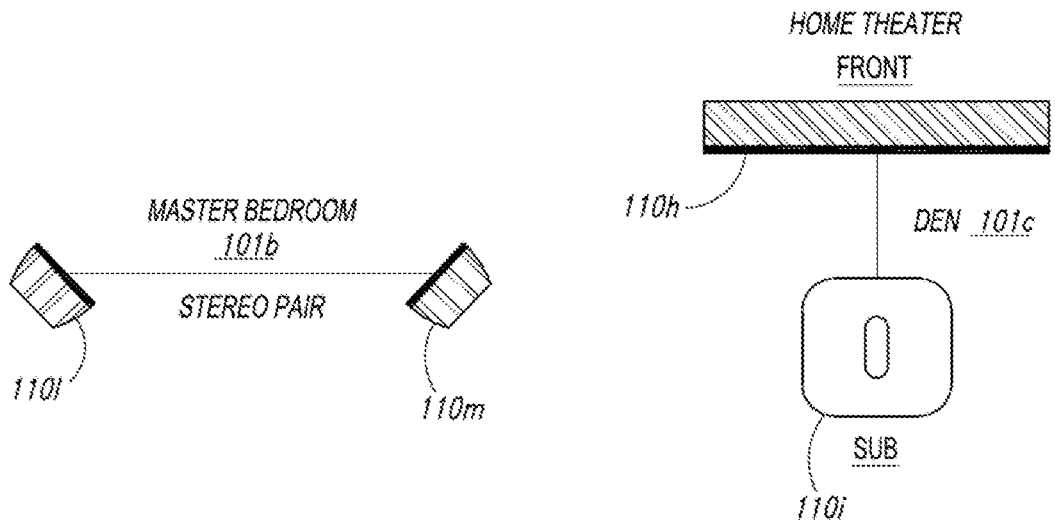
FIGS. 1J through 1M are schematic diagrams of example corresponding media playback system zones.
Figures 1L, 1M:
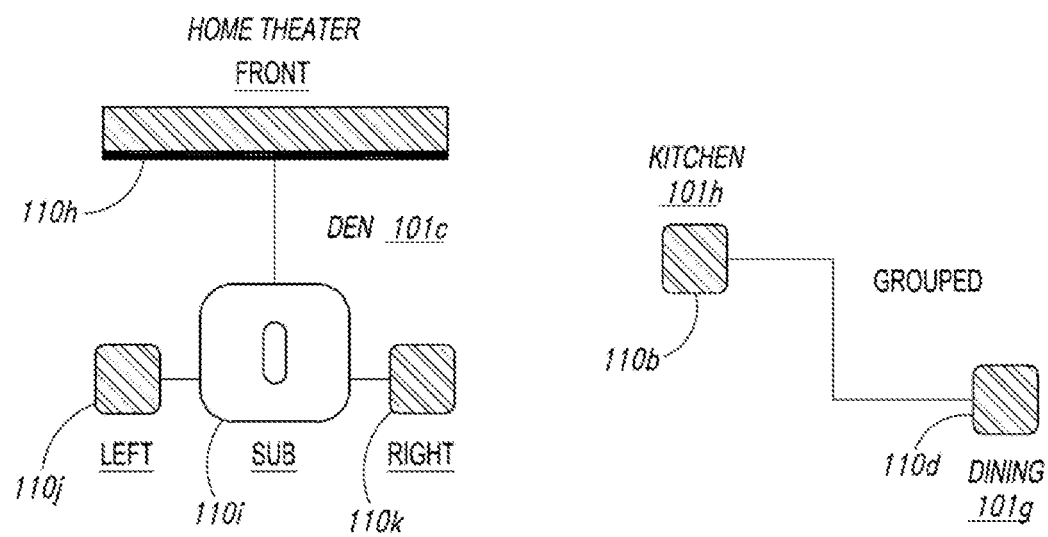
Figure 2:
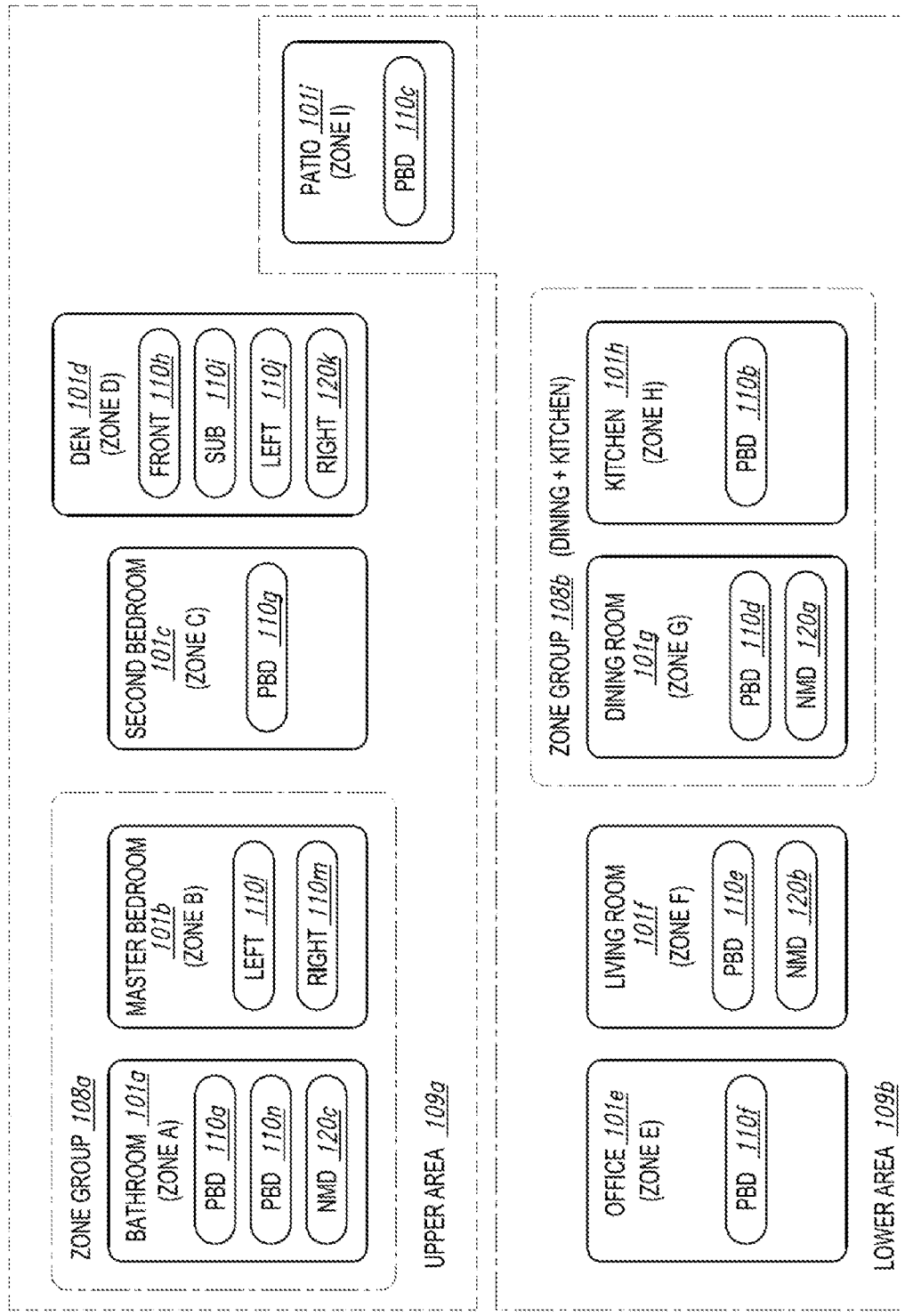
FIG. 2 is a schematic diagram of example media playback system areas.

FIGS. 1J through 2 show example configurations of playback devices in zones and zone groups. Referring first to FIG. 2, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110m (e.g., a right playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback zones 110g and 110h can be merged to form a merged group or a zone group 108b. The merged playback zones 110g and 110h may not be specifically assigned different playback responsibilities. That is, the merged playback zones 110h and 110i may, aside from playing audio content in synchrony, each play audio content as they would if they were not merged.

Each zone in the MPS 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1J, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1K, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1L shows the Front and SUB devices 110h and 110i further bonded with Left and Right playback devices 110j and 110k, respectively. In some implementations, the Right and Left devices 110j and 110k can be configured to form surround or "satellite" channels of a home theater system. The bonded playback devices 110h, 110i, 110j, and 110k may form a single Zone D (FIG. 2).

Playback devices that are merged may not have assigned playback responsibilities and may each render the full range of audio content the respective playback device is capable of. Nevertheless, merged devices may be represented as a single UI entity (i.e., a zone, as discussed above). For instance, the playback devices 110a and 110n in the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 2, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 2. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1M). Identifiers associated with the Kitchen may indicate the same or similar information by virtue of the Kitchen being part of the Dining+Kitchen zone group 108b. Other example zone variables and identifiers are described below.

In yet another example, the MPS 100 may include variables or identifiers representing other associations of zones and zone groups, such as identifiers associated with Areas, as shown in FIG. 2. An area may involve a cluster of zone groups and/or zones not within a zone group. For instance, FIG. 2 shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

Figure 3:
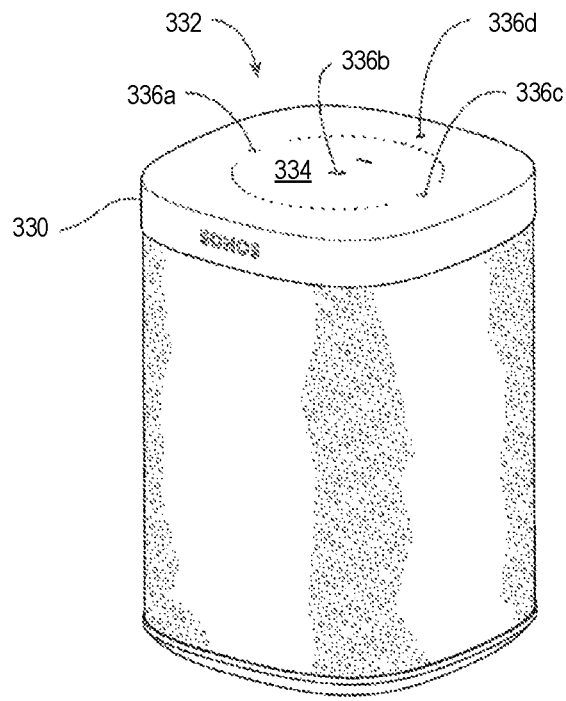
FIG. 3 is an isometric diagram of an example playback device housing.

FIG. 3 shows an example housing 330 of the playback device 110 that includes a user interface in the form of a control area 332 at a top portion 334 of the housing 330. The control area 332 includes buttons 336-c for controlling audio playback, volume level, and other functions. The control area 332 also includes a button 236d for toggling the microphones 222 to either an on state or an off state. The control area 332 is at least partially surrounded by apertures formed in the top portion 334 of the housing 330 through which the microphones 222 (not visible in FIG. 3) receive the sound in the environment of the playback device 110. The microphones 222 may be arranged in various positions along and/or within the top portion 334 or other areas of the housing 330 so as to detect sound from one or more directions relative to the playback device 110.

In some embodiments, the playback device 110 may take the form of a wired and/or wireless headphone (e.g., an over-ear headset, an on-ear headset, or an in-ear headset). For instance, FIG. 4 shows an example headset assembly 400 ("headset 400") for such an implementation of the playback device 110. As shown, the headset 400 includes a headband 402 that couples a first earcup 404a to a second earcup 404b. Each of the earcups 404a and 404b may house any portion of the electronic components in the playback device 110, such as one or more speakers. Further, one or more of the earcups 404a and 404b may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406a and 406b that are coupled to ear cups 404a and 404b, respectively. The ear cushions 406a and 406b may provide a soft barrier between the head of a user and the earcups 404a and 404b, respectively, to improve user comfort and/or provide acoustic isolation from the ambient (e.g., passive noise reduction (PNR)).

III. Example Techniques for Updating Network Configuration Parameters

Figure 5:
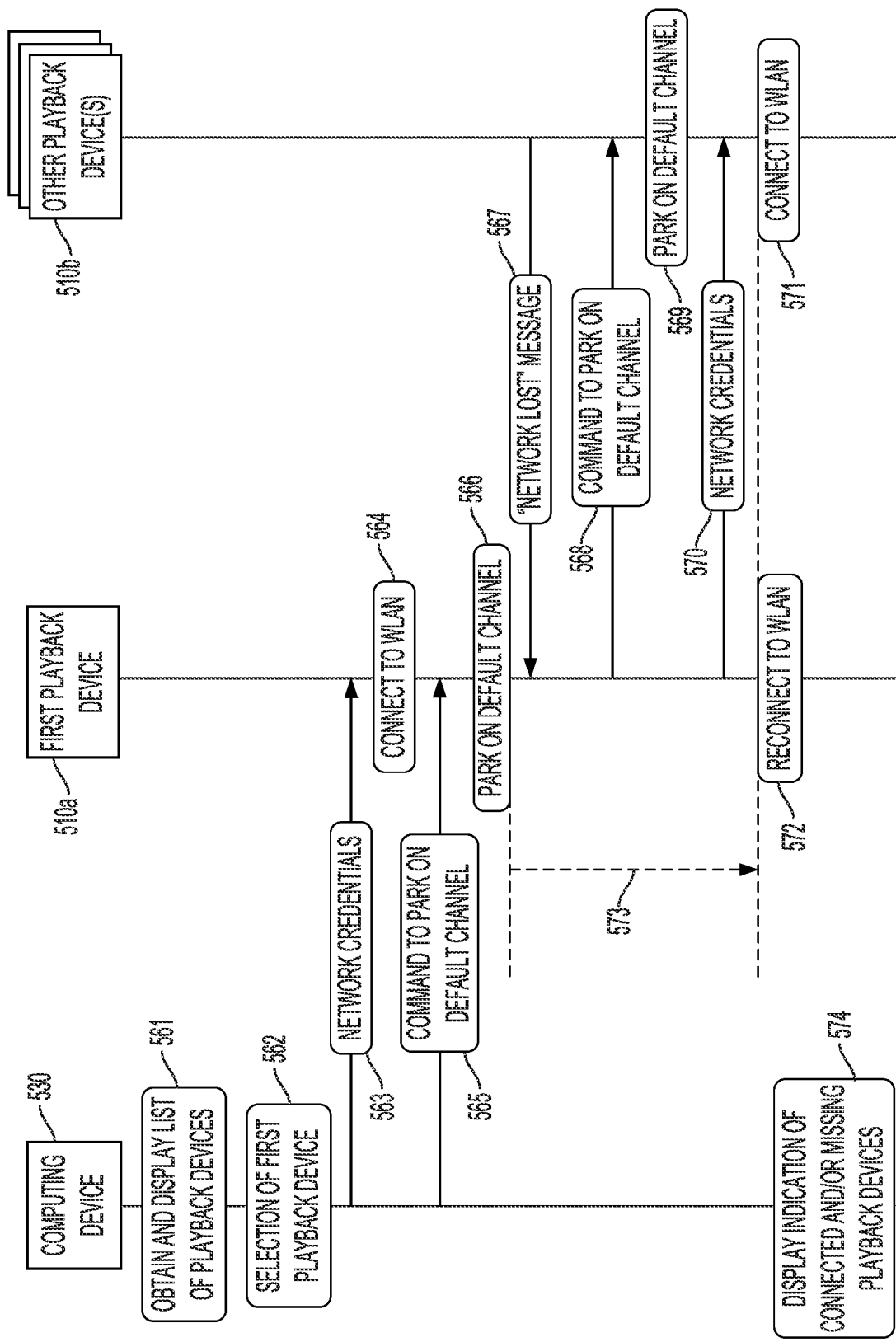
FIG. 5 is an example message flow diagram for reconfiguring network credentials in a media playback system.

Turning now to FIG. 5, an example message flow diagram for reconfiguring network credentials in a media playback system is illustrated. FIG. 5 shows a computing device 530 (e.g., a smartphone), which may correspond to the control device 130a discussed above and shown in FIGS. 1A-1B and FIG. 1H. FIG. 5 also shows a first playback device 510a and one or more other playback devices 510b, each of which may correspond to any of the playback device 110 discussed above and shown in FIGS. 1A-1E and FIGS. 3-4. Further, the message flow diagram shown in FIG. 5 will be described with reference to FIGS. 6A-6F, which illustrates a sequence of schematic diagrams of an example media playback system 500, of which the computing device 530 and playback devices 510a and 510b may be members.

Initially, before message flow diagram shown in FIG. 5 begins, the devices of the example media playback system 500 may be connected to a secure wireless network. This condition is shown by way of example in FIG. 6A, which illustrates the computing device 530, the first playback device 510a, and the other playback devices 510b connected to a first secure wireless network 560a (e.g., a first WLAN 560a) that may include a network router 509a. In this regard, the first WLAN 560a may generally correspond to the local network 160 shown in FIG. 1B.

Figure 6A:
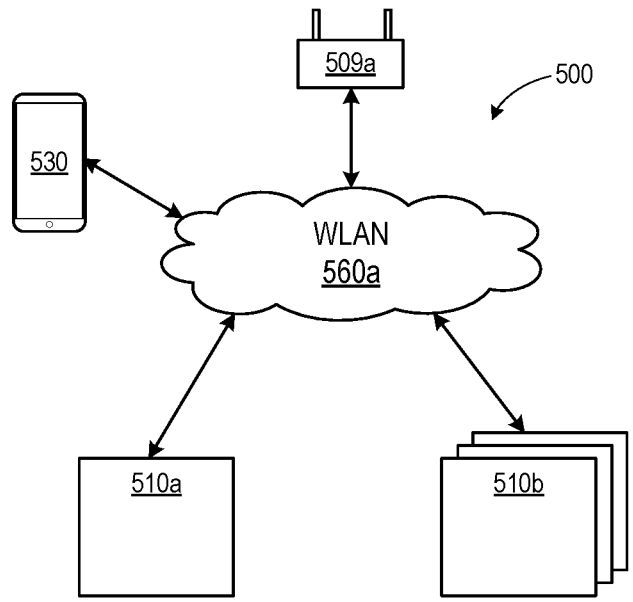
FIG. 6A is a schematic diagram of an example media playback system operating on a first secure wireless network using a first set of network credentials.
Figure 6B:
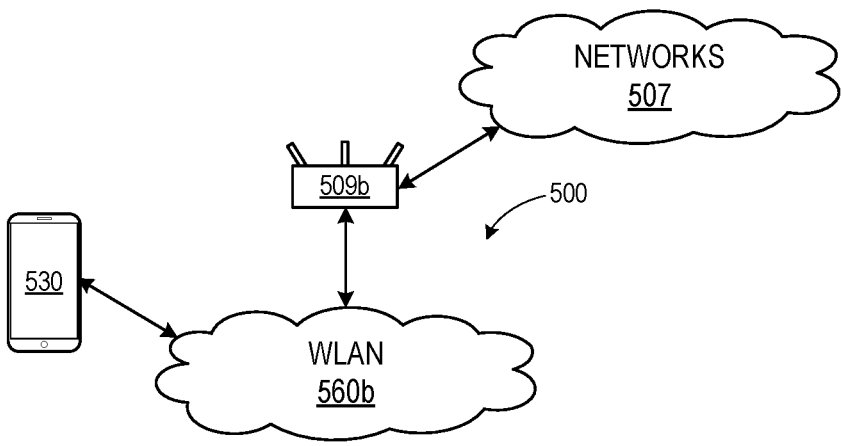
FIG. 6B is a schematic diagram of a control device of the example media playback system of FIG. 6A communicating with a wide area network using a second set of network credentials.
Figure 6B:
Figure 6C:
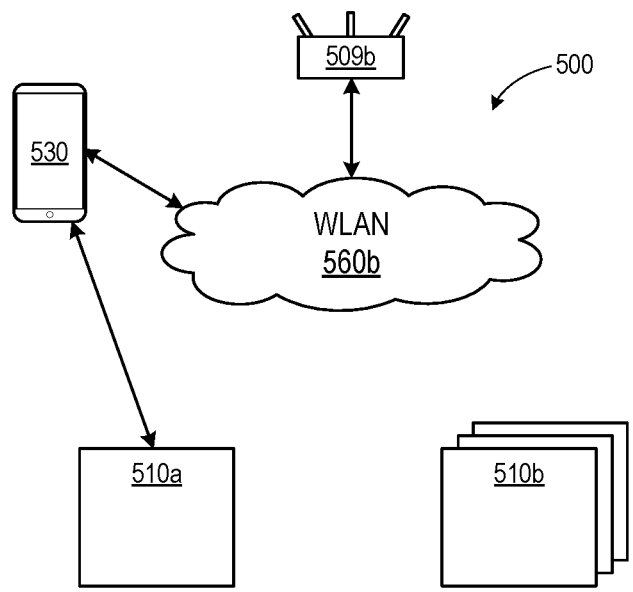
FIG. 6C is a schematic diagram of the control device of FIG. 6B reconfiguring a first playback device of the media playback system with the second set of network credentials.
Figure 6D:
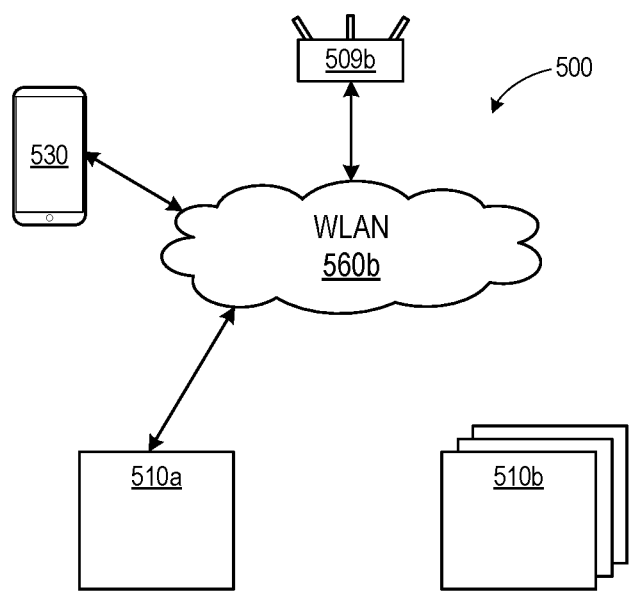
FIG. 6D is a schematic diagram of first playback device of FIG. 6C using the second set of network credentials to connect to the second secure wireless network.
Figure 6E:
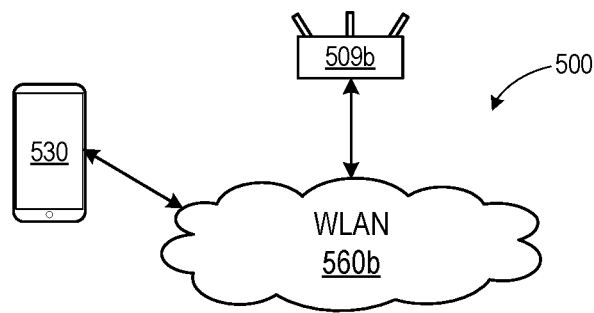
FIG. 6E is a schematic diagram of the first playback device of FIG. 6B reconfiguring the other playback devices of the media playback system with the second set of network credentials.
Figure 6E:
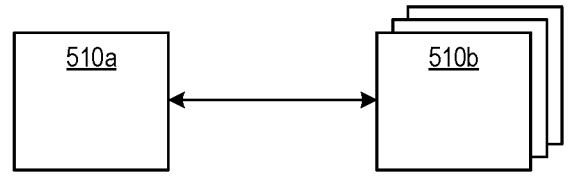
Figure 6F:
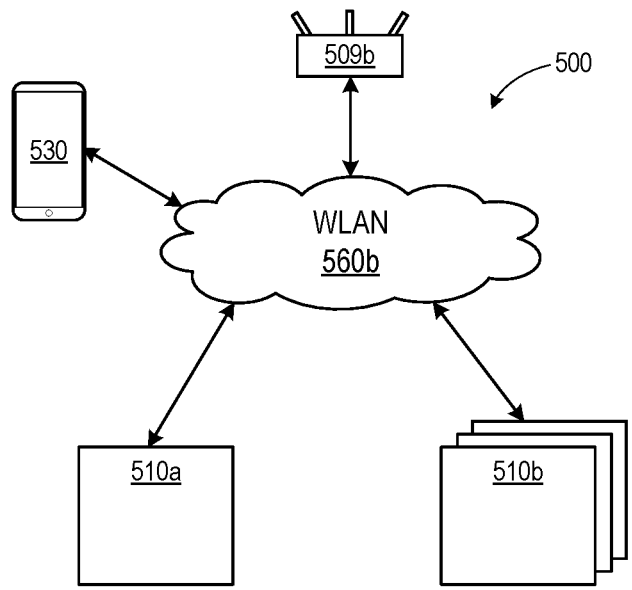
FIG. 6F is a schematic diagram of the example media playback system of FIG. 6A operating on the second secure wireless network using the second set of network credentials.

As discussed above, a user of the media playback system 500 may elect to change one or more of the network configuration parameters associated with first WLAN 560a. For example, as shown in FIG. 6B, the user may replace the network router 509a with a new network router 509b. The user may further select a new SSID and/or a new password to be used with the new network router 509b, which other devices may use to connect to the new secure WLAN 560b. The user may then reconfigure the computing device 530 with the new network credentials to connect to the new WLAN 560b. As discussed previously, the examples herein may also encompass situations where the network configuration parameters (e.g., the password) of the network router 509a are updated, such that the playback devices of the media playback system 500 require the updated password.

Figure 7C:
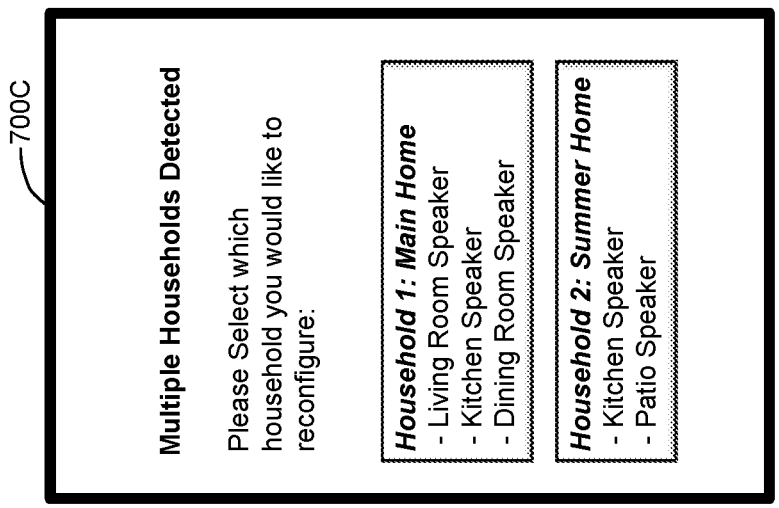
FIGS. 7A through 7I are example screens for a graphical user interface presented by a computing device.

As noted above, the computing device 530 may be installed with a media playback system controller application that is used to control the media playback system 500. For example, when the devices of the media playback system 500 were connected to the WLAN 560a, as shown in FIG. 6A, the user may have controlled various aspects the media playback system 500 using the controller application. However, when the user opens the controller application after installing the new network router 509b, the computing device 530 may determine that although it is connected to a secure wireless network, i.e., the WLAN 560b, there are no playback devices connected to the network. Based on these conditions, the computing device 530 may infer that the user has changed their network configuration parameters. Thus, the computing device 530 may display a prompt or other message (e.g., "Did you get a new router or change the password?") that facilitates the user making a selection to update the network credentials for the playback devices of the media playback system. For instance, the controller app may detect activation of the "reconfigure network settings" button in screen 700A. Accordingly, the user may provide an input indicating a request to update the playback devices, such as a selection of the "Reconfigure Network Settings" button shown in FIG. 7A.

Returning to the message flow diagram of FIG. 5, after receiving the user input to update the playback devices, the computing device 530 may, at step 561, obtain a list of playback devices in the media playback system 500. As will be discussed further below, the list of playback devices may be used by the computing device 530 for a selection of a first playback device to be updated, as well as to confirm that each of the playback devices in the media playback system has been successfully updated.

Figure 7B:
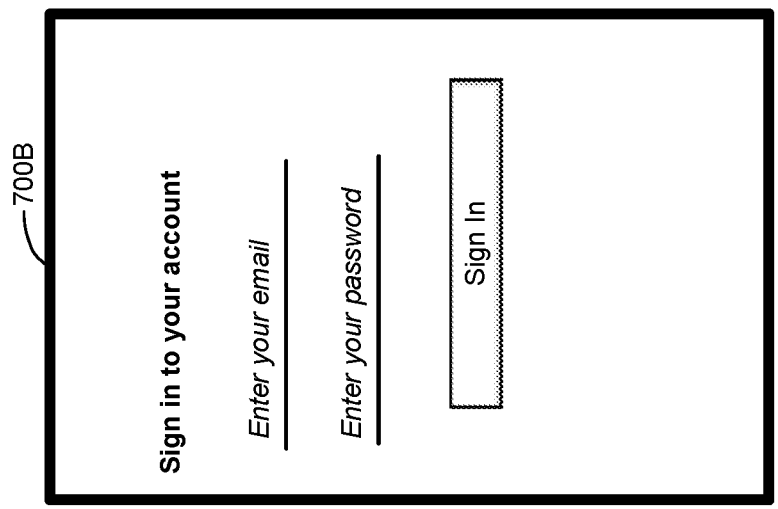
Figure 7A:
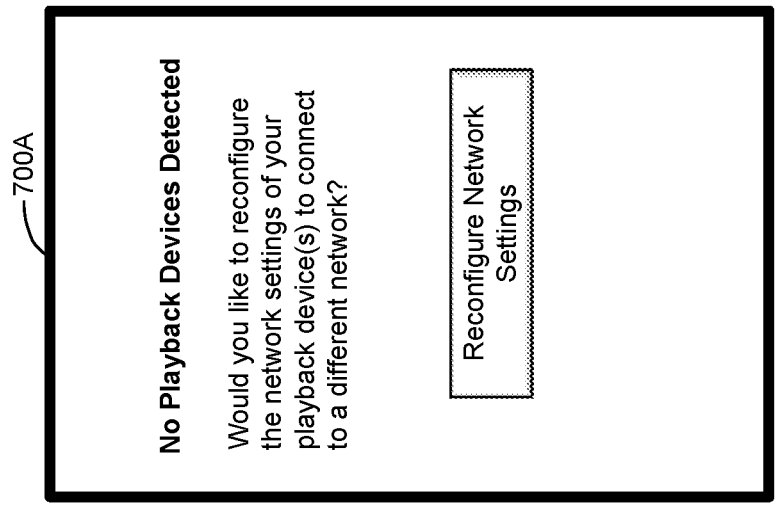

The computing device may obtain the list of playback devices in the media playback system 500 in various ways. As an initial matter however, the computing device 530 may prompt the user to login to their media playback system account (e.g., their SONOS account) via the media controller application, if they are not already logged in. An example of such a login prompt is shown in FIG. 7B by screen 700B. Once logged in, the computing device 530 may have access to a local cache stored by the controller application that includes a list of playback devices for the last media playback system that the computing device 530 was connected to (e.g., while logged in). Additionally or alternatively, logging in to the user's media playback system account may allow the computing device 530 to access one or more cloud-based computing devices (e.g., SONOS servers) to retrieve the list of playback devices. This step is illustrated in the example schematic diagram in FIG. 6B, which shows the computing device 530 communicating with networks 507 to obtain the list of playback devices. In this regard, the networks 507 may correspond to the networks 107 shown in FIG. 1B and may include one or more of the computing devices 106, one or more of which (e.g., computing device 106c) may provide the list of playback devices to the computing device 530.

In some cases, a user might have multiple different media playback systems, perhaps located in different locations (e.g., a home system, an office system), associated with their media playback system user account. In these situations, the computing device 530 may first prompt the user to select, from a list of media playback systems, which media playback system they are trying to update with new network configuration parameters, such that the correct list of playback devices may be obtained. An example of such a user prompt is shown in FIG. 7C by screen 700C. As shown, the user has two households including a first household for their main home (including living room, kitchen, and dining room playback devices) and a second household for their summer home (including a kitchen playback device and a patio playback device). The list of media playback systems may be obtained, similar to the list of playback devices discussed above, from the one or more cloud-based computing devices (e.g., via networks 507), and/or the local cache stored on the computing device 530 by the controller application, which may include an indication of one or more media playback systems to which the computing device 530 was connected recently (e.g., within the last 10 days).

To facilitate this selection of the media playback system, the computing device 530 may identify a nearby playback device that is broadcasting its serial number (e.g., over BLE), which will be discussed in further detail below. Based on identifying the nearby playback device, the computing device 530 may identify the media playback system from the list that includes the nearby playback device as the most likely media playback system the user wishes to update with new network configuration parameters. In one example, the computing device 530 may then display an indication of the most likely media playback system to the user for confirmation, rather than displaying a list of all media playback systems from which the user has to make a selection. In another example, the computing device 530 may display an indication of two or more of the media playback systems in the obtained list of media playback systems and visually highlight the most likely media playback system (e.g., by presenting it first in the list and/or graphically distinguishing it from other media playback systems in the obtained list). In a case in which none of media playback systems are identified as the most likely media playback system, most if not all media playback systems in the obtained list of media playback systems may be displayed. The obtained list of media playback systems may be displayed in an order based one or more factors (e.g., a number of playback devices in the respective media playback systems, how recently the computing device 530 was in communication with each media playback system, whether the media playback systems are present in both a list obtained from the networks 507 and the local cache from the computing device 530, etc.) Other examples are also possible.

Figure 7F:
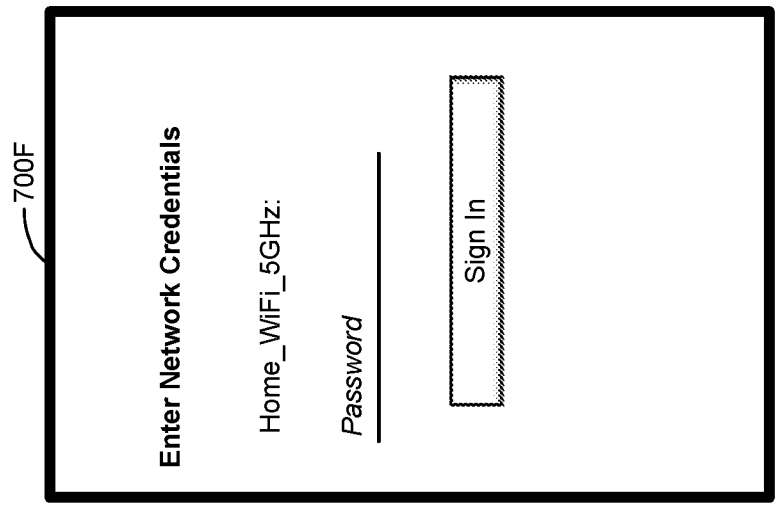
Figure 7E:
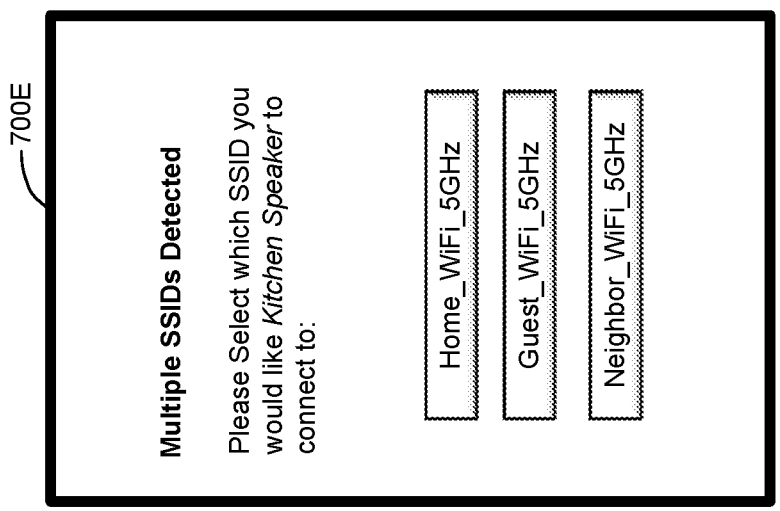
Figure 7D:
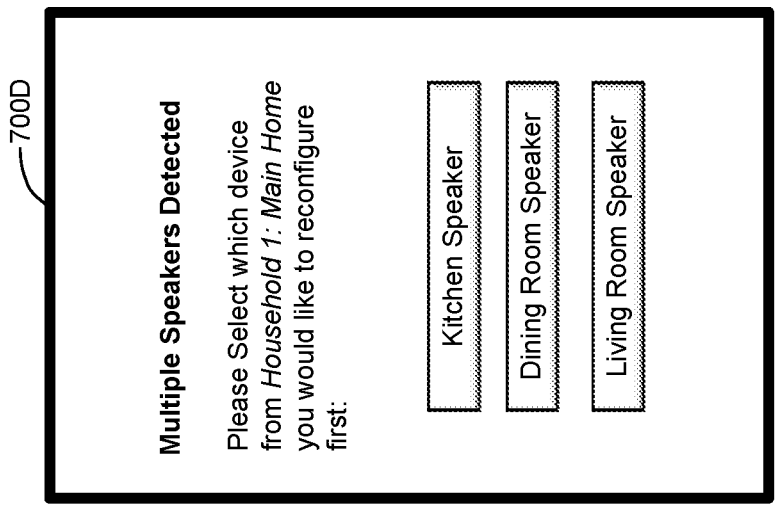

Once the correct media playback system has been selected (if necessary) and the list of playback devices obtained, the computing device 530 may display the list of playback devices to the user, as shown at step 561 of FIG. 5. The user may then be prompted to select a first playback device from the list to start updating the network configuration parameters, which may involve establishing a direct connection between the computing device 530 and the selected playback device. An example of such a user prompt is shown in FIG. 7D by screen 700D. As shown, the screen 700D includes a list of all available playback devices in the selected household (i.e., the first household of screen 700C) and requests the user to select a playback device from the list. In this regard, the computing device 530 may order the playback devices on the list based on various factors, similar to the presentation of the list of media playback systems discussed above. In some situations, the computing device 530 may detect a nearby playback device based on a BLE beacon, as noted above. Thus, the computing device 530 may present the nearby playback device as a first choice for beginning the update, or as a singular choice for the user to confirm in lieu of presenting the full list. Additionally or alternatively, the computing device 530 may order the playback devices on the list based on their known networking capabilities, with a preference for simpler and/or more reliable direct connections that may be made with the computing device 530. For instance, playback devices with BLE capability may be listed higher than playback devices without BLE capability.

At step 562, the computing device 530 may receive a user input indicating a first playback device to be updated from the list, which is shown in FIG. 5 and FIGS. 6A-6F as playback device 510*a*. The computing device 530 may then establish a direct connection with the first playback device 510*a*, which may take various forms. In some cases, as noted above, the first playback device 610*a* may have BLE capability, and may begin broadcasting a BLE beacon including its serial number and availability for connection after it determines that it has lost its network connection to a WLAN. Accordingly, if the computing device 530 is within range and can detect the BLE beacon, it may establish a direct connection to the first computing device over BLE and then undertake a mutual authentication with the first playback device 510*a* (discussed below). As another possibility, the computing device 530 may prompt the user to move closer to the selected first playback device 510*a*, if it has been identified as a BLE capable device but the computing device 530 does not yet detect the beacon.

As yet another possibility, the selected first playback device 510*a* may not have BLE capability. In these situations, the user may be prompted with an instruction to place the first playback device 510*a* into an open access point (AP) mode to enable it to make a direct connection with the computing device 530. For example, the computing device 530 may display an instruction for the user to press a button on the first playback device 510*a* to place it in open AP mode. As noted above, the computing device 530 may establish a direct connection to the first playback device 510*a* and then undertake a 2-way mutual authentication with the first playback device 510*a* before prompting the user to enter the new network configuration parameters for the first playback device 510*a*.

The mutual authentication may take various forms. In some cases, the first playback device 510*a* may pass a PIN code to the computing device 530 in a way that requires relatively close proximity between the devices, such as passing the PIN code via NFC or audio modulation. The two devices can then mutually verify, over the direct communication path, using the PIN code. U.S. Application No. 63/083,637 discusses various other types of authentication for establishing a secure direct connection between a computing device and a playback device, and is incorporated by reference herein in its entirety.

After establishing and authenticating a direct connection with the first playback device 510*a*, the computing device 530 may query the first playback device 510*a* for a list of wireless networks that are visible to the first playback device 510*a*. The computing device 530 then presents the user with the list of networks, an example of which is shown in FIG. 7E by the screen 700E. The computing device 530 may suggest a particular wireless network from the list of wireless networks in screen 700E (e.g., by ordering the suggested wireless network first, emphasizing the text and/or button(s) associated with the suggested wireless network, etc.). For instance, the computing device may suggest the user select the same wireless network the computing device is currently connected to. The user may then select a network for connection, which may prompt the user to enter the new network credentials. For example, the user may select the SSID of the WLAN 560*b* (e.g., Home WiFi 5 GHz), and then enter the password when prompted, as shown in FIG. 7F by the screen 700F. The computing device 530 may then transmit the updated network credentials to the first playback device, as shown in FIG. 5 at step 563. This step is also illustrated in the schematic diagram shown in FIG. 6C.

In this regard, it may be noted that the user has already input the new network credentials via the computing device 530 at least once, to establish a connection of the computing device 530 to the WLAN 560*b*. And the computing device 530 may have stored the network credentials in local memory for its own use. However, these network credentials may be stored in a location that is not accessible to the controller application (e.g., in an operating system-level memory). Thus, the user may be required to input the network credentials again, for at least the first playback device 510*a*. Alternatively, in cases where the network credentials for WLAN 560*b* that the user had previously input via the computing device 530 are accessible by the controller application, the user may not be prompted to input the network credentials again.

Figure 7G:
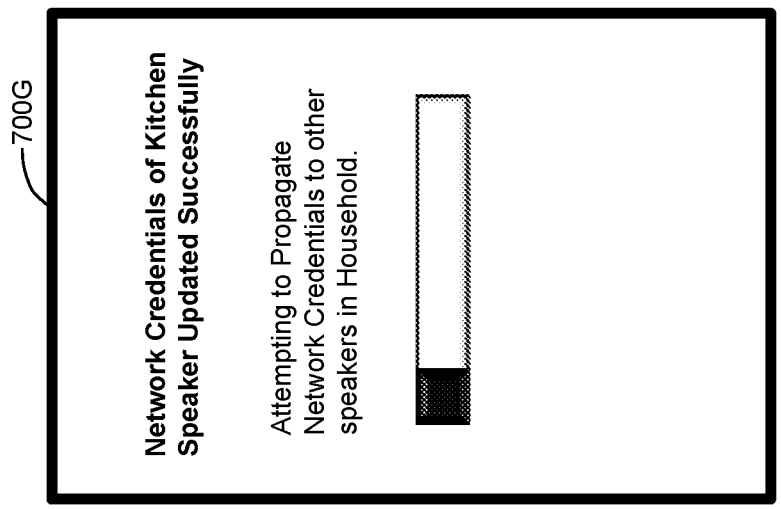

After receiving the network credentials from the computing device 530, the first playback device 510*a* may connect to the WLAN 560*b*, and thus may communicate with the computing device 530 over the WLAN 560*b*. This is illustrated in the schematic diagram shown in FIG. 6D. At this stage, there are numerous possibilities for how the updated network credentials may be further distributed among the other playback devices 510*b* of the media playback system 500, with little or no user input. As shown in FIG. 7G in the screen 700G, the computing device 530 may notify the user of the successful connection of the first playback device 510*a* (e.g., the Kitchen playback device), and may further notify the user that further automatic updating of the user's media playback system is underway.

For instance, in some situations, the computing device 530 may be near enough to one or more of the other playback devices 510*b* having BLE capability such that the computing device 530 detects a BLE beacon broadcast by the other playback device 510*b*. As it did with the first playback device 510*a*, the computing device 530 may establish and authenticate a direct connection with the other playback device 510*b* over BLE and thereby provide the updated network credentials.

As another possibility, the other playback devices 510*b* may, in response to losing their network connection to the former WLAN 560*a*, undertake a scanning operation by which they search for available network connections. For example, each other playback device 510*b* may cycle through all available WiFi channels, broadcasting probe messages advertising that it has lost its network connection. In many cases, each other playback device 510*b* may park on the channel that it last had a connection to the WLAN 560*a* for several seconds between scans. If the new WLAN 560*b* is operating on the same WiFi channel, this period of time during which each of the other playback devices 510*b* parks on the same channel as the first playback device 510*a* may be long enough for the first playback device 510*a* to establish a direct connection with the other playback device(s) 510*b* and transmit the new network credentials. Thus, the first playback device 510*a* may automatically update the other playback devices 510*b* with the new network credentials without any additionally user input, allowing each other playback device 510*b* to connect to the WLAN 560*b*.

However, in other situations, the new WLAN 560*b* may operate on a different channel than the previous WLAN 560*a*. Further, in cases where the WLAN 560*a* and/or the WLAN 560*b* are mesh networks facilitated by multiple access points, the WLAN 560*a* and/or the WLAN 560*b* might operate on more than one WiFi channel. In these embodiments, some of the other playback devices 510*b* might park on a given channel, while others might park on a different channel, and the first playback device 510*a* might be connected to the WLAN 560*b* on yet a different channel. Thus, the other playback devices 510*b* may not spend enough time on the same channel as the first playback device 510*a* for the network credentials to be updated automatically.

For this reason, it may be desirable to designate a default WiFi channel on which all playback devices should park. Accordingly, the computing device 530 may transmit a command to the first playback device 510*a* to park on a default channel, as shown in FIG. 5 at step 565. In some cases, this may involve the first playback device 510*a* temporarily disconnecting from the WLAN 560*b*. For instance, the command may include an instruction for the first playback device 510*a* to park on the default channel for a predetermined period of time (e.g., 80 seconds), shown by way of example in FIG. 5 as the dashed line 573, after which the first playback device 510*a* will reconnect to the WLAN 560*b*.

In some implementations, the computing device 530 might transmit the command to park on the default channel in conjunction with the network credentials, effectively combining the elements of steps 563 and 565 into a single message. For example, the command to park on the default channel may be a command to park on the default channel once a connection to the WLAN 560*b* has been successfully established using the new network credentials.

At step 566, the first playback device 510*a* parks on the default WiFi channel. At this stage, the first playback device 510*a* may operate in a mode in which it is configured to respond to any probe messages it receives from the other playback devices 510*b* advertising their lost network connection. As shown in FIG. 5, the first playback device 510*a* may receive such a message at step 567 from one of the other playback devices 510*b*. In response, the first playback device 510*a* may transmit a command instructing the other playback device 510*b* to stop scanning and park on the default WiFi channel, as shown at step 568.

Based on receiving the command in step 568, the other playback device 510*b* may park on the default WiFi channel at step 569. At this point, the first playback device 510*a* may establish a direct connection with the other playback device 510*b* and transmit the new network credentials, as shown at step 570. This state is also shown in the schematic diagram illustrated in FIG. 6E. This may ultimately allow the other playback device 510*b* to connect to the WLAN 560*b* using the new network credentials received from first playback device 510*a*, as shown at step 571.

However, the other playback device 510*b* might not connect to the WLAN 560*b* immediately upon receiving the new network credentials. Rather, in some embodiments the command received from the first playback device 510*a* at step 568 may resemble the command received by the first playback device 510*a* at step 565. In particular, the command at step 568 may instruct the other playback device 510*b* to remain parked on the default WiFi channel for a certain period of time, even after receiving the new network credentials. For example, the first playback device 510*a* may instruct the other playback device 510*b* to remain on the default channel for the remaining portion of the predetermined period of time 573 for which the first playback device 510*a* is going to remain parked on the default channel, such that both playback devices will connect/reconnect to the WLAN 560*b* at approximately the same time. In this regard, the first playback device 510*a* may determine, at the time that it transmits the command at step 568, how much time has elapsed since it parked on the default channel at step 566, and thus how much time is remaining in the predetermined period of time 573. This remaining time may be encoded into the command transmitted at step 568.

Instructing the other playback device 510*b* to remain on the default channel may be advantageous for various reasons. As one example, the other playback devices 510*b* that remain parked on the default channel may establish direct, point-to-point connections with each other, as well as with the first playback device 510*a*, which may accelerate the propagation of the network credentials among the playback devices of the media playback system 500. As another example, one or more of the other playback devices 510*b* in the media playback system 500 (e.g., a "remote" playback device) may be physically located such that it is too remote from the first playback device 510*a* for the first playback device 510*a* to receive its probe message at step 567, or for the remote playback device to receive the response from the first playback device 510*a* at step 568, or both. However, the remote playback device may be within range of a second playback device 510*b* that was near enough to the first playback device 510*a* to carry out the exchanges in the steps discussed above and shown in FIG. 5. Thus, by remaining on the default channel, the second playback device 510*b* may effectively mirror the operations of the first playback device 510*a* in providing the network credentials to the remote playback device.

Accordingly, after the first playback device 510*a* propagates the new network credentials across a first "hop" to one or more of the other playback devices 510*b*, those other playback devices 510*b* may propagate the new network credentials across a second "hop" to any other playback devices 510*b* that were not covered by the first hop. Thus, it will be appreciated that the duration of the predetermined period of time 573 discussed above may be established based on the time it takes for the network credentials to be propagated across one hop. For example, if it is determined (e.g., via testing) that it takes, on average, 25-35 seconds for a first playback device 510*a* and a second playback device 510*b* to proceed from step 566 to step 570 (i.e., a single hop), the predetermined period of time 573 may be set to 80 seconds so as to allow the network credentials to be propagated across two hops of playback devices, with some margin for error. In some embodiments, the computing device 530 may obtain (e.g., along with the list of playback devices at step 561) information regarding the setup of playback devices in the media playback system 500, which might include information regarding the point-to-point signal strength of each playback device to each other playback device. From this information, the computing device 530 might be capable of determining a likely point-to-point network topology of the media playback system 500, including how many hops may be needed to propagate the network credentials to all players. As a result, the predetermined period of time 573 may be adjusted accordingly.

In another embodiment, the first playback device 510a may be instructed to remain parked on the default channel for a period of time that corresponds to only one hop (e.g., a first hop), while instructing other playback devices 510b to which it establishes a direct connection and transmits the network credentials to park on the default channel and remain parked for an additional period of time that corresponds to one hop (e.g., a second hop). In this way, playback devices of the media playback system 500 may connect to the WLAN 560b, and thus become visible to the computing device 530 again, in waves from nearest to farthest. For example, the first playback device 510a may reconnect to the WLAN 560b first, followed by the other playback devices 510b that received the network credentials during the first hop, followed by additional playback devices that received the network credentials during the second hop, and so on. Other possibilities also exist.

Figure 7H:
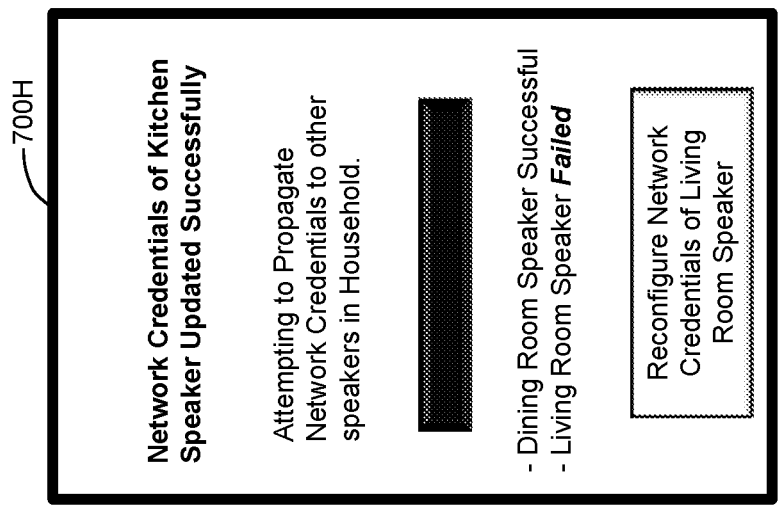

At step 574, after each playback device that has received the updated network credentials has connected to the WLAN 560b, the computing device 530 may display an indication that the playback devices are now visible on the WLAN 560b, and are controllable via the computing device 530. An example of such an indication is shown in FIG. 7H as screen 700H (e.g., showing that updating the network credentials of the Dining Room Speaker was successful). In some cases, all playback device of the media playback system 560 may obtain the updated network credentials in this way, and the updating of the user's media playback system may be complete. This is shown by way of example in the schematic diagram in FIG. 6F.

Figure 7I:
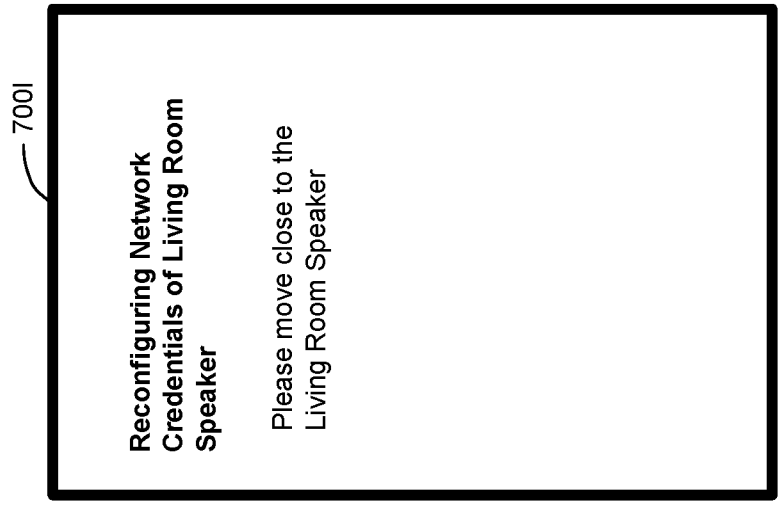

In other embodiments, the computing device 530 may determine that one or more playback devices from the list of playback devices obtained at step 561 have not connected to the WLAN 560b, despite the predetermined period of time 573 for propagating the updated network credentials having ended. In response, the computing device 530 may display a notification to the user, such as the notification shown in the example screen 700H that the updating of the Living Room Speaker failed. In these cases, the computing device 530 may also display an option for the user to take an additional action to manually update the missing playback device, such as the option to "Reconfigure Network Credentials of Living Room Speaker" shown on the example screen 700H. If the user selects the option, the computing device 530 may display an instruction for the user to update the missing playback device, such as the instruction to "Please move close to the Living Room Speaker" shown on the example screen 700I in FIG. 7I. For example, this may allow the computing device 530 to detect the missing playback device's BLE beacon.

One or more playback devices of the media playback system 500 may be missing in this way for various reasons. As one possibility, a missing playback device may be located within range of the network router 509b during normal operation, yet located so remotely from any other playback device that it cannot benefit from the point-to-point propagation of network credentials described above. As another possibility, a missing playback device might not have the capability of making point-to-point connections with other playback devices. In both of these scenarios, the computing device 530 might be capable of identifying that the steps discussed above will not be effective for connecting such playback devices to WLAN 560b based on identifying information that it has obtained for the playback devices, as discussed above in connection to step 561. As such, the computing device 530 might prompt the user to manually update such playback devices at an earlier stage in the message flow diagram shown in FIG. 5. For example, the computing device 530 may prompt the user to manually update any playback devices that cannot make a point-to-point connection after the computing device 530 transmits the command to the first playback device 510a at step 565. In this way, the user may simultaneously update any playback devices in the media playback system 500 that require user interaction while the rest of the playback devices are automatically updated according to the steps shown in FIG. 5. In this regard, the computing device 530 might display a screen similar to the screen 700I shown in FIG. 7I after it determines that the first playback device 510a has successfully established a connection to the WLAN 560b. Once the user completes the manual setup of any additional devices in this way, the computing devices 530 may revert to displaying a screen similar to the screen 700G shown in FIG. 7G, to indicate that the rest of the media playback system is still being automatically updated.

As another possibility, a given playback device of the media playback system 500 that is capable of point-to-point connections may nonetheless fail to receive the updated network credentials due to one or more communication errors in the steps discussed above. Such errors may occur for any number of reasons, including network attenuation among other possibilities. In these situations, a selection option for the user to "Try Again" may not be possible at step 574, since the playback devices are no longer parked on the default channel that was used to facilitate the propagation of network credentials. Thus, the user may be prompted to manually update the missing playback device, as discussed above.

FIG. 5 includes one or more operations, functions, or actions as illustrated by one or more of operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowchart shown in FIG. 5 and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIGS. 5-8 may represent circuitry and/or machinery that is wired or arranged to perform the specific functions in the process.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing device comprising:
a graphical display;
at least one processor;
non-transitory computer-readable medium; and
program instructions stored on the non-transitory computer-readable medium that are executable by the at least one processor such that the computing device is configured to:
    establish a connection to a secure wireless network;
    determine that one or more playback devices of a media playback system are not connected to the secure wireless network;
    receive, via the graphical display, a user input indicating a request to update the one or more playback devices with network configuration parameters for the secure wireless network;
    retrieve, from storage, a list of the one or more playback devices of the media playback system;
    receive, via the graphical display, an input indicating a first playback device to be updated from the list;
    establish an initial communication path with the first playback device;
    transmit a set of one or more messages to the first playback device collectively comprising the network configuration parameters for the secure wireless network;
    receive an indication that the first playback device has established a connection to the secure wireless network; and
    after receiving the indication that the first playback device has established the connection to the secure wireless network, transmit, to the first playback device, a command to:
        temporarily disconnect from the secure wireless network for a given period of time;
        while temporarily disconnected from the secure wireless network, (i) scan for messages from other playback devices on a default wireless channel and (ii) respond to messages from other playback devices on the default wireless channel with instructions to scan for messages from other playback devices on the default wireless channel; and
        after the given period of time, reconnect to the secure wireless network.

2. The computing device of claim 1, wherein the secure wireless network is a second secure wireless network, the computing device further comprising program instructions stored on the non-transitory computer-readable medium that are executable by the at least one processor such that the computing device is configured to:
    before establishing the connection to the second wireless network:
        establish a connection to the one or more playback devices of the media playback system via a first secure wireless network; and
        disconnect from the first secure wireless network.

3. The computing device of claim 1, further comprising program instructions stored on the non-transitory computer-readable medium that are executable by the at least one processor such that the computing device is configured to:
    detect a BLE beacon transmitted by the first playback device; and
    based at least in part on detecting the BLE beacon, display a selectable indication of the first playback device, wherein the program instructions that are executable by the at least one processor such that the computing device is configured to receive the input indicating the first playback device comprise program instructions that are executable by the at least one processor such that the computing device is configured to detect a selection of the selectable indication of the first playback device.

4. The computing device of claim 1, further comprising program instructions stored on the non-transitory computer-readable medium that are executable by the at least one processor such that the computing device is configured to:
based on determining that the one or more playback devices of the media playback system are not connected to the secure wireless network, automatically display, via the graphical display, an indication prompting a user to update the one or more playback devices.

5. The computing device of claim 1, wherein the program instructions that are executable by the at least one processor such that the computing device is configured to retrieve, from storage, the list of one or more playback devices of the media playback system comprise program instructions that are executable by the at least one processor such that the computing device is configured to:
request, from a cloud-based computing system, a list of one or more media playback systems that are associated with a user account of a user, where each media playback system in the list of one or more media playback systems comprises a respective list of playback devices associated with the respective media playback system;
receive, from the cloud-based computing system, the list of one or more media playback systems, wherein the list of one or more media playback systems includes the media playback system; and
display, via the graphical display, at least the media playback system from the list of one or more media playback systems.

6. The computing device of claim 5, further comprising program instructions stored on the non-transitory computer-readable medium that are executable by the at least one processor such that the computing device is configured to:
detect a BLE beacon transmitted by the first playback device; and
determine that the first playback device is listed in the list of one or more playback devices associated with the media playback system, wherein the program instructions that are executable by the at least one processor such that the computing device is configured to display, via the graphical display, at least the media playback system from the list of one or more playback systems comprise program instructions that are executable by the at least one processor such that the computing device is configured to:
based on detecting the BLE beacon, display only the media playback system from the list of one or more media playback systems.

7. The computing device of claim 1, further comprising program instructions stored on the non-transitory computer-readable medium that are executable by the at least one processor such that the computing device is configured to:
identify a given playback device of the media playback system that did not receive the network configuration parameters for the secure wireless network from the first playback device; and
display, via the graphical display, an instruction for a user to provide the network configuration parameters for the secure wireless network to the given playback device.

8. The computing device of claim 7, wherein the program instructions that are executable by the at least one processor such that the computing device is configured to identify the given playback device of the media playback system that did not receive the network configuration parameters for the secure wireless network from the first playback device comprise program instructions that are executable by the at least one processor such that the computing device is configured to:
identify the given playback device based on a model of the given playback device, wherein the model of the given playback device is incapable of communicating with the first playback device via a direct communication path.

9. A non-transitory computer-readable medium, wherein the non-transitory computer-readable medium is provisioned with program instructions that, when executed by at least one processor, cause a computing device to:
establish a connection to a secure wireless network;
determine that one or more playback devices of a media playback system are not connected to the secure wireless network;
receive, via a graphical display of the computing device, a user input indicating a request to update the one or more playback devices with network configuration parameters for the secure wireless network;
retrieve, from storage, a list of the one or more playback devices of the media playback system;
receive, via the graphical display, an input indicating a first playback device to be updated from the list;
establish an initial communication path with the first playback device;
transmit a set of one or more messages to the first playback device collectively comprising the network configuration parameters for the secure wireless network;
receive an indication that the first playback device has established a connection to the secure wireless network; and
after receiving the indication that the first playback device has established the connection to the secure wireless network, transmit, to the first playback device, a command to:
temporarily disconnect from the secure wireless network for a given period of time;
while temporarily disconnected from the secure wireless network, (i) scan for messages from other playback devices on a default wireless channel and (ii) respond to messages from other playback devices on the default wireless channel with instructions to scan for messages from other playback devices on the default wireless channel; and
after the given period of time, reconnect to the secure wireless network.

10. The non-transitory computer-readable medium of claim 9, wherein the secure wireless network is a second secure wireless network, and wherein the non-transitory computer-readable medium is also provisioned with program instructions that, when executed by at least one processor, cause the computing device to:
before establishing the connection to the second wireless network:
establish a connection to the one or more playback devices of the media playback system via a first secure wireless network; and
disconnect from the first secure wireless network.

11. The non-transitory computer-readable medium of claim 9, wherein the non-transitory computer-readable medium is also provisioned with program instructions that, when executed by at least one processor, cause the computing device to:
- detect a BLE beacon transmitted by the first playback device; and
- based at least in part on detecting the BLE beacon, display a selectable indication of the first playback device, wherein the program instructions that, when executed by at least one processor, cause the computing device to receive the input indicating the first playback device comprise program instructions that, when executed by at least one processor, cause the computing device to:
  - detect a selection of the selectable indication of the first playback device.

12. The non-transitory computer-readable medium of claim 9, wherein the non-transitory computer-readable medium is provisioned with program instructions that, when executed by at least one processor, cause the computing device to:
- based on determining that the one or more playback devices of the media playback system are not connected to the secure wireless network, automatically display, via the graphical display, an indication prompting a user to update the one or more playback devices.

13. The non-transitory computer-readable medium of claim 9, wherein the program instructions that, when executed by at least one processor, cause the computing device to retrieve, from storage, the list of one or more playback devices of the media playback system comprise program instructions that, when executed by at least one processor, cause the computing device to:
- request, from a cloud-based computing system, a list of one or more media playback systems that are associated with a user account of a user, where each media playback system in the list of one or more media playback systems comprises a respective list of playback devices associated with the respective media playback system;
- receive, from the cloud-based computing system, the list of one or more media playback systems, wherein the list of one or more media playback systems includes the media playback system; and
- display, via the graphical display, at least the media playback system from the list of one or more media playback systems.

14. The non-transitory computer-readable medium of claim 13, wherein the non-transitory computer-readable medium is provisioned with program instructions that, when executed by at least one processor, cause the computing device to:
- detect a BLE beacon transmitted by the first playback device; and
- determine that the first playback device is listed in the list of one or more playback devices associated with the media playback system, wherein the program instructions that, when executed by at least one processor, cause the computing device to display, via the graphical display, at least the media playback system from the list of one or more media playback systems comprise program instructions that, when executed by at least one processor, cause the computing device to:
  - based on detecting the BLE beacon, display only the media playback system from the list of one or more media playback systems.

15. The non-transitory computer-readable medium of claim 9, wherein the non-transitory computer-readable medium is provisioned with program instructions that, when executed by at least one processor, cause the computing device to:
- identify a given playback device of the media playback system that did not receive the network configuration parameters for the secure wireless network from the first playback device; and
- display, via the graphical display, an instruction for a user to provide the network configuration parameters for the secure wireless network to the given playback device.

16. The non-transitory computer-readable medium of claim 15, wherein the program instructions that, when executed by at least one processor, cause the computing device to identify the given playback device of the media playback system that did not receive the network configuration parameters for the secure wireless network from the first playback device comprise program instructions that, when executed by at least one processor, cause the computing device to:
- identify the given playback device based on a model of the given playback device, wherein the model of the given playback device is incapable of communicating with the first playback device via a direct communication path.

17. A method carried out by a computing device, the method comprising:
- establishing a connection to a secure wireless network;
- determining that one or more playback devices of a media playback system are not connected to the secure wireless network;
- receiving, via a graphical display of the computing device, a user input indicating a request to update the one or more playback devices with network configuration parameters for the secure wireless network;
- retrieving, from storage, a list of the one or more playback devices of the media playback system;
- receiving, via the graphical display, an input indicating a first playback device to be updated from the list;
- establishing an initial communication path with the first playback device;
- transmitting a set of one or more messages to the first playback device collectively comprising the network configuration parameters for the secure wireless network;
- receiving an indication that the first playback device has established a connection to the secure wireless network; and
- after receiving the indication that the first playback device has established the connection to the secure wireless network, transmitting, to the first playback device, a command to:
  - temporarily disconnect from the secure wireless network for a given period of time;
  - while temporarily disconnected from the secure wireless network, (i) scan for messages from other playback devices on a default wireless channel and (ii) respond to messages from other playback devices on the default wireless channel with instructions to scan for messages from other playback devices on the default wireless channel; and
  - after the given period of time, reconnect to the secure wireless network.

* * * * *